F. W. COTTERMAN.
WINDING MACHINE.
APPLICATION FILED AUG. 23, 1916.

1,377,808.

Patented May 10, 1921.
25 SHEETS—SHEET 4.

F. W. COTTERMAN.
WINDING MACHINE.
APPLICATION FILED AUG. 23, 1916.

1,377,808.

Patented May 10, 1921.
25 SHEETS—SHEET 6.

Witnesses

Inventor
Fred W. Cotterman
By Sturtevant & Mason
Attorneys

F. W. COTTERMAN.
WINDING MACHINE.
APPLICATION FILED AUG. 23, 1916.

1,377,808.

Patented May 10, 1921.
25 SHEETS—SHEET 7.

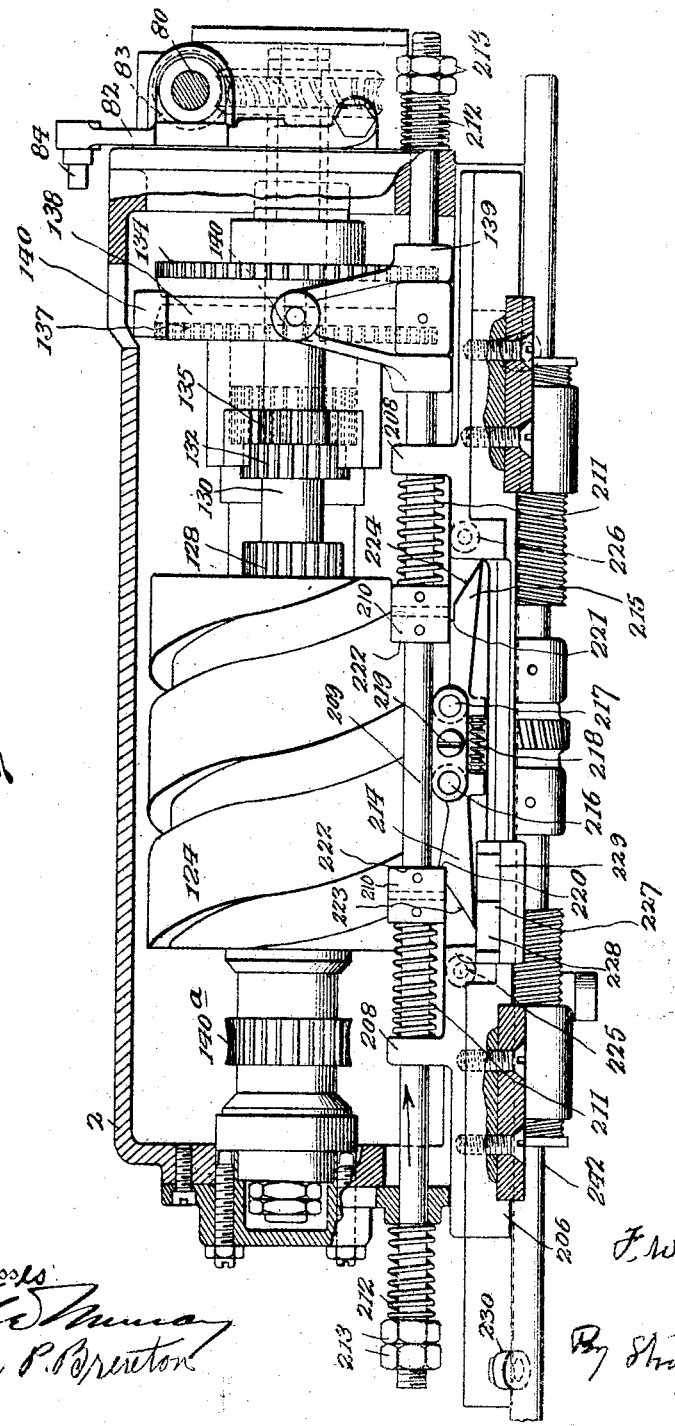

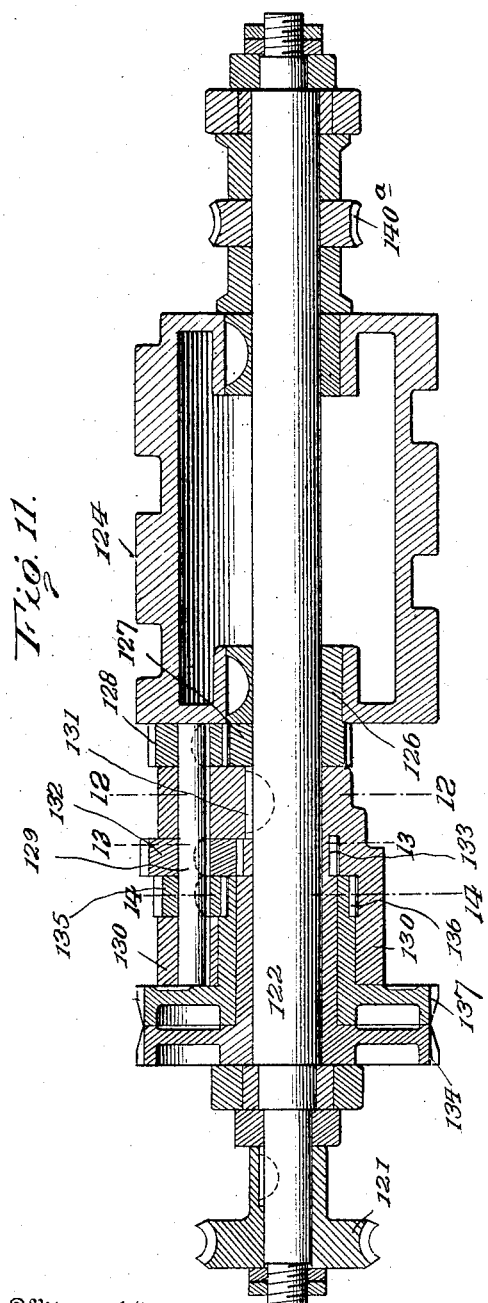
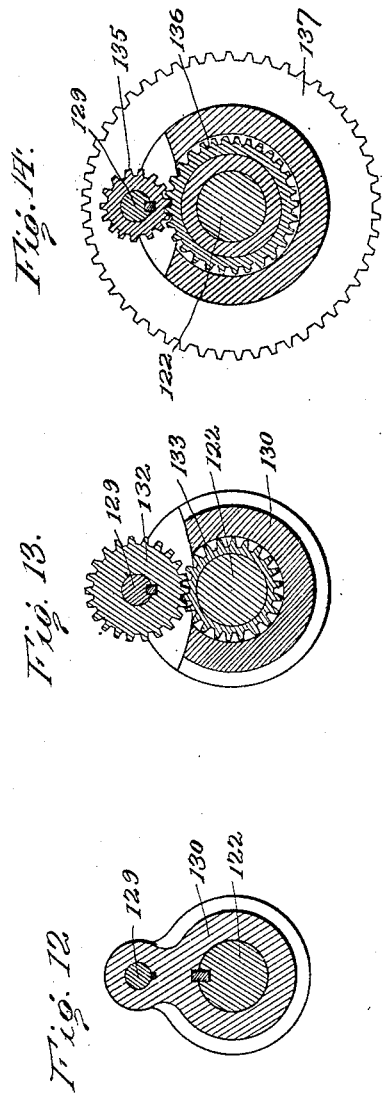

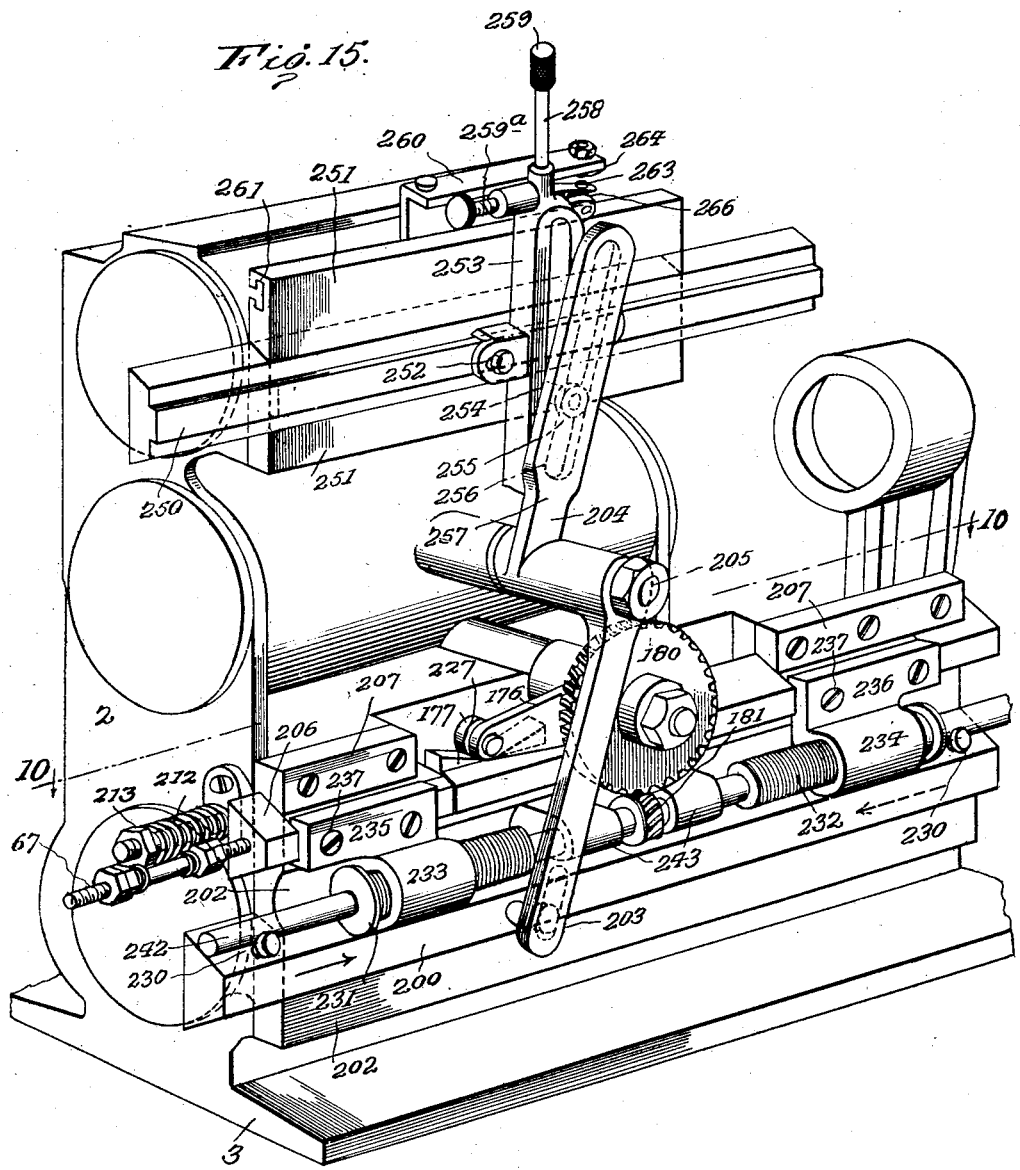

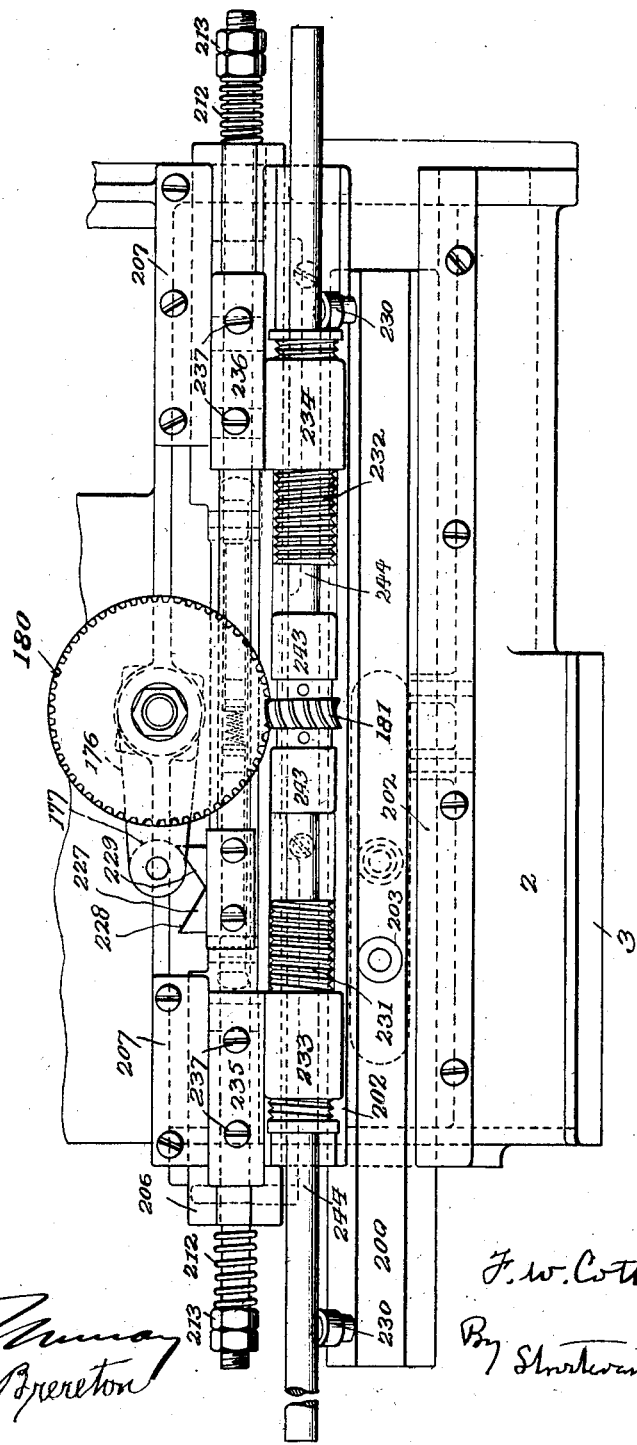

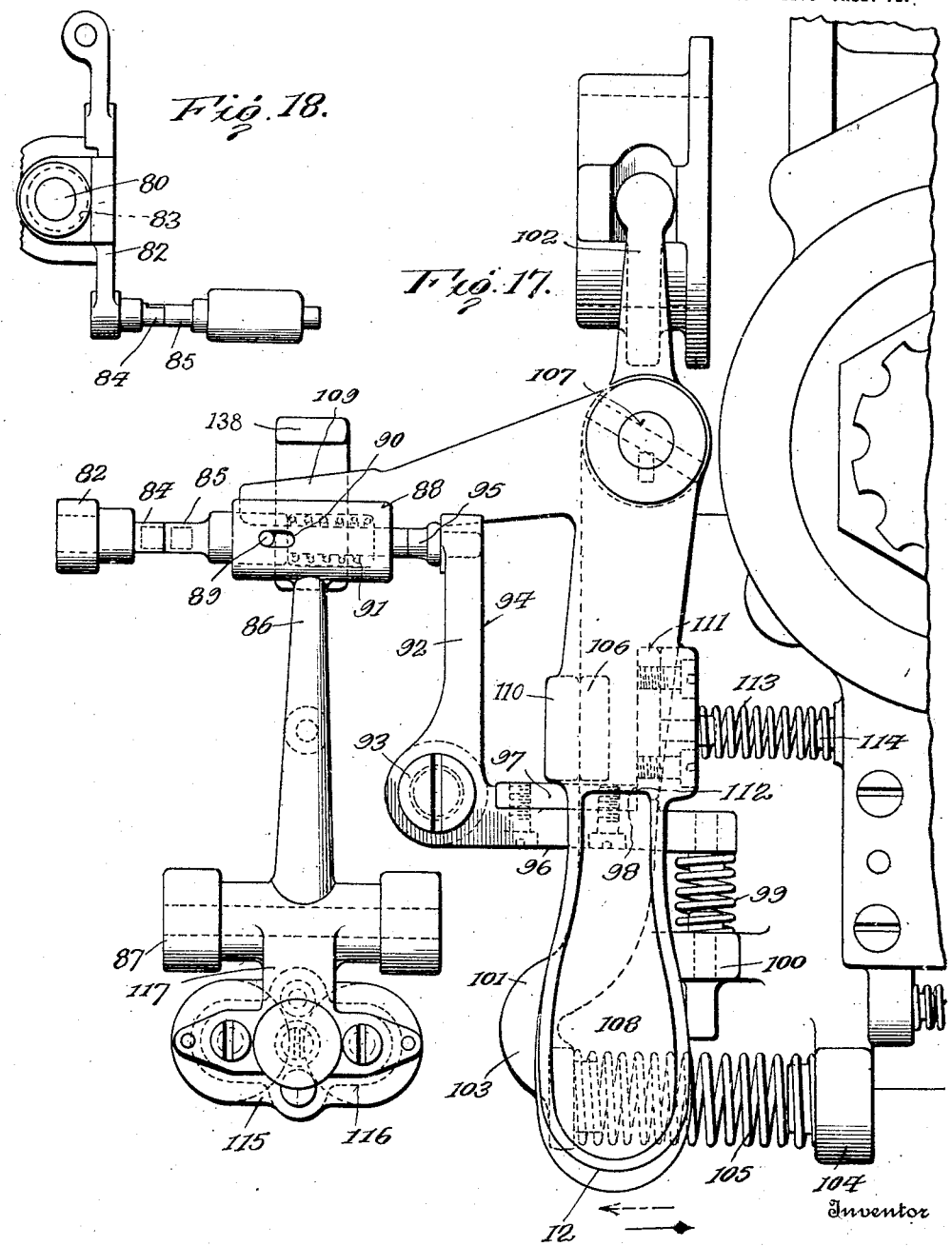

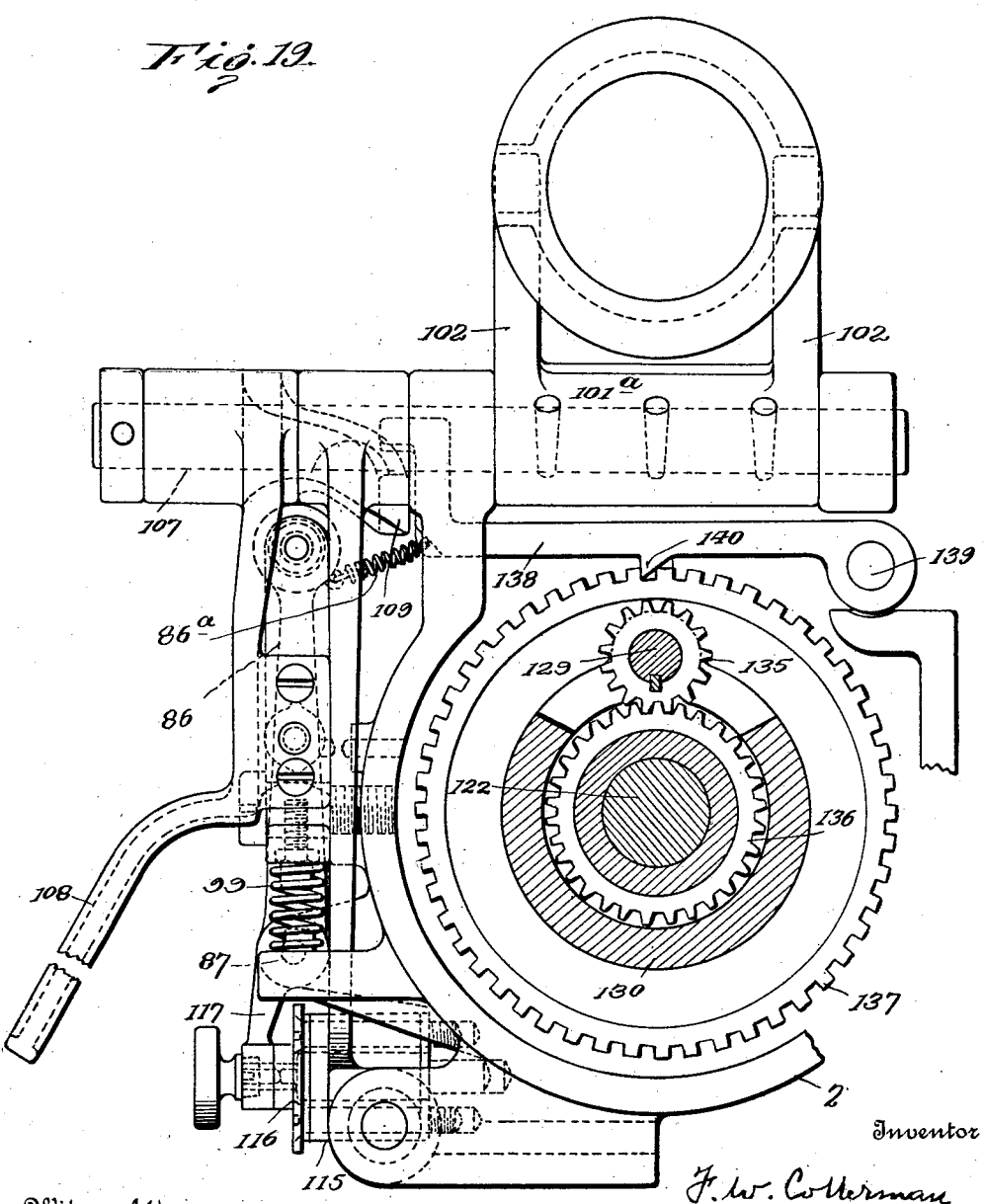

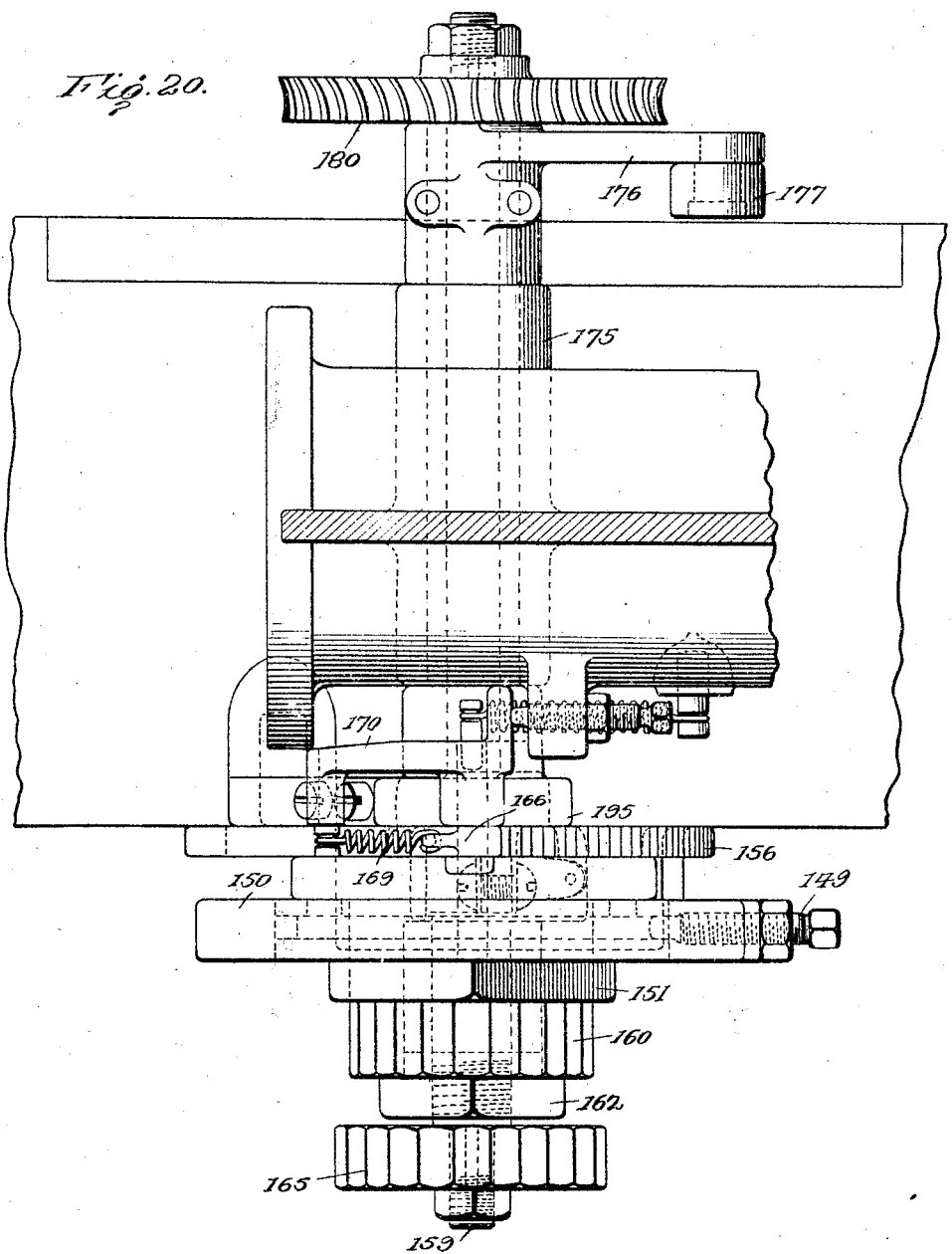

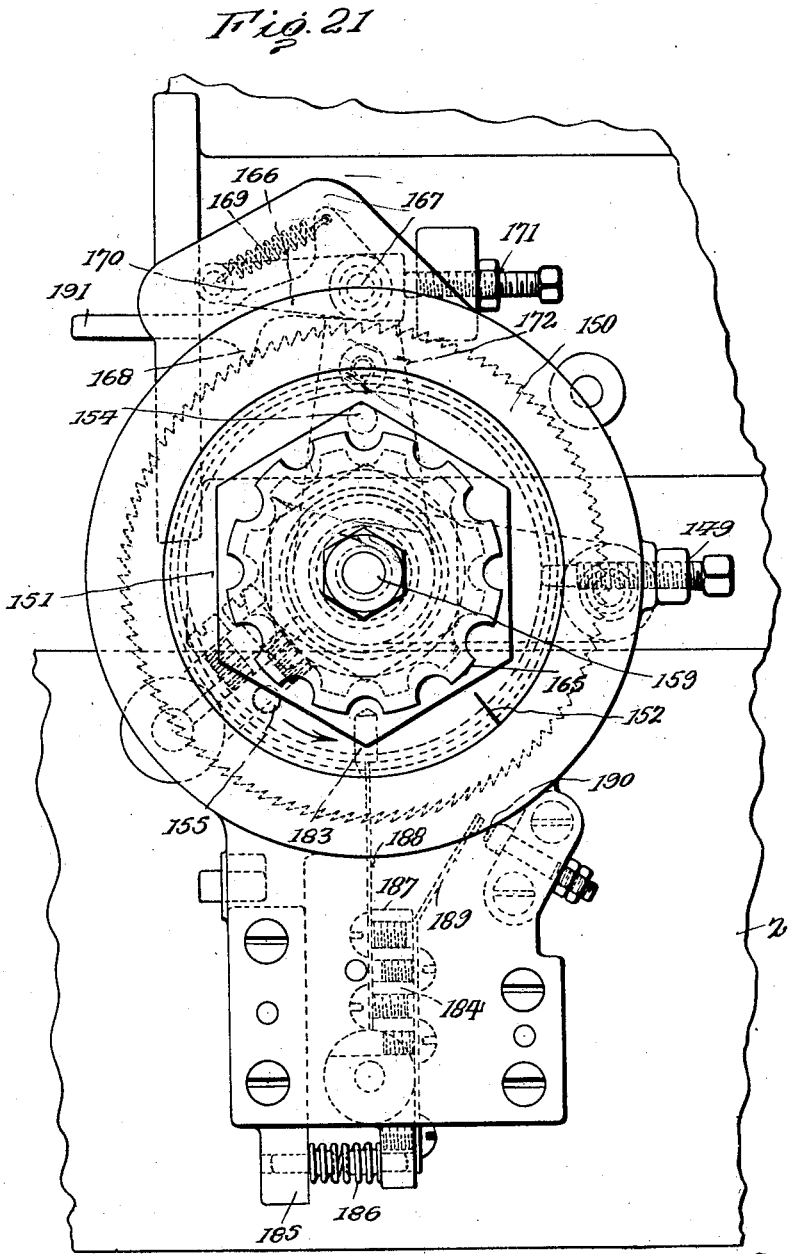

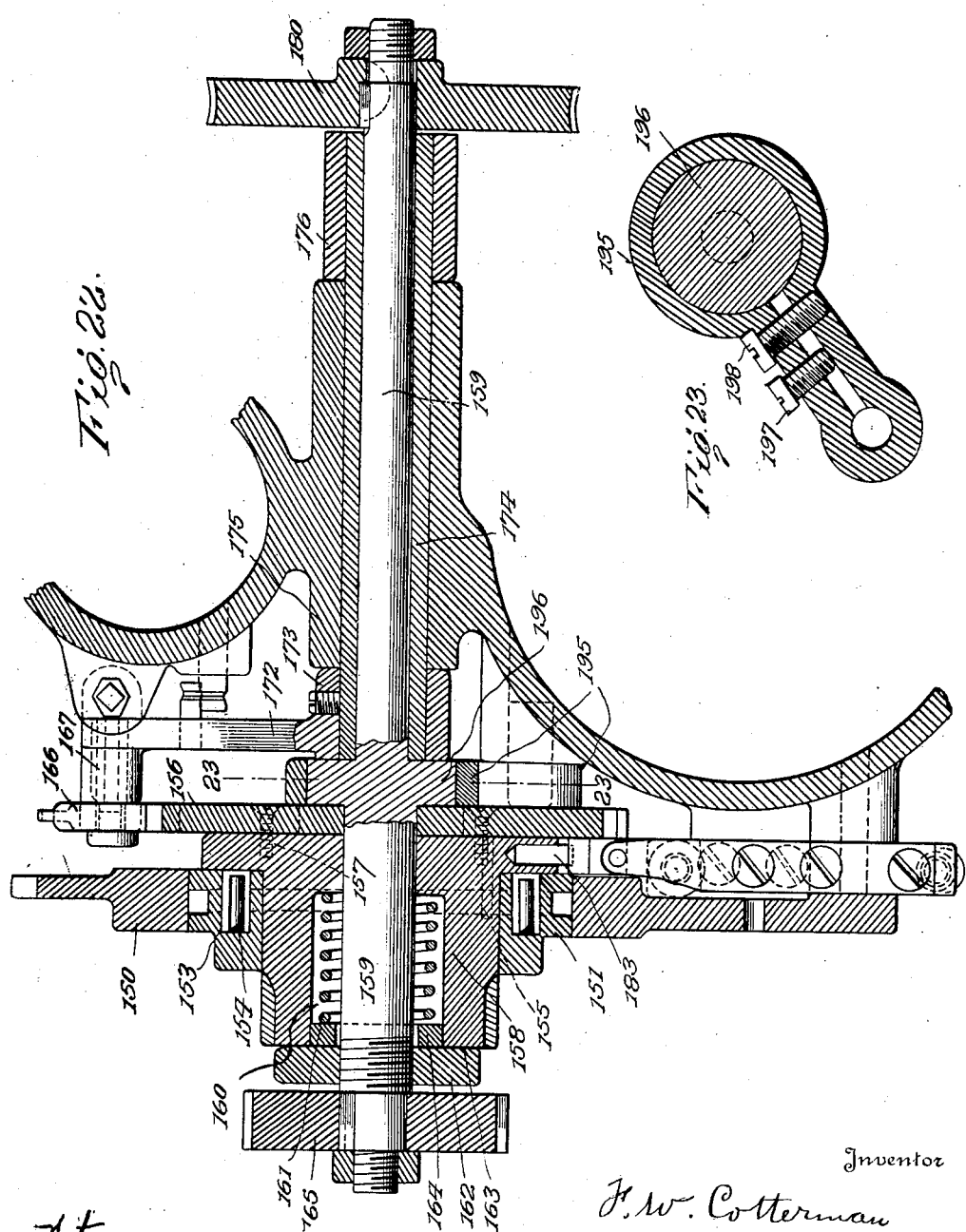

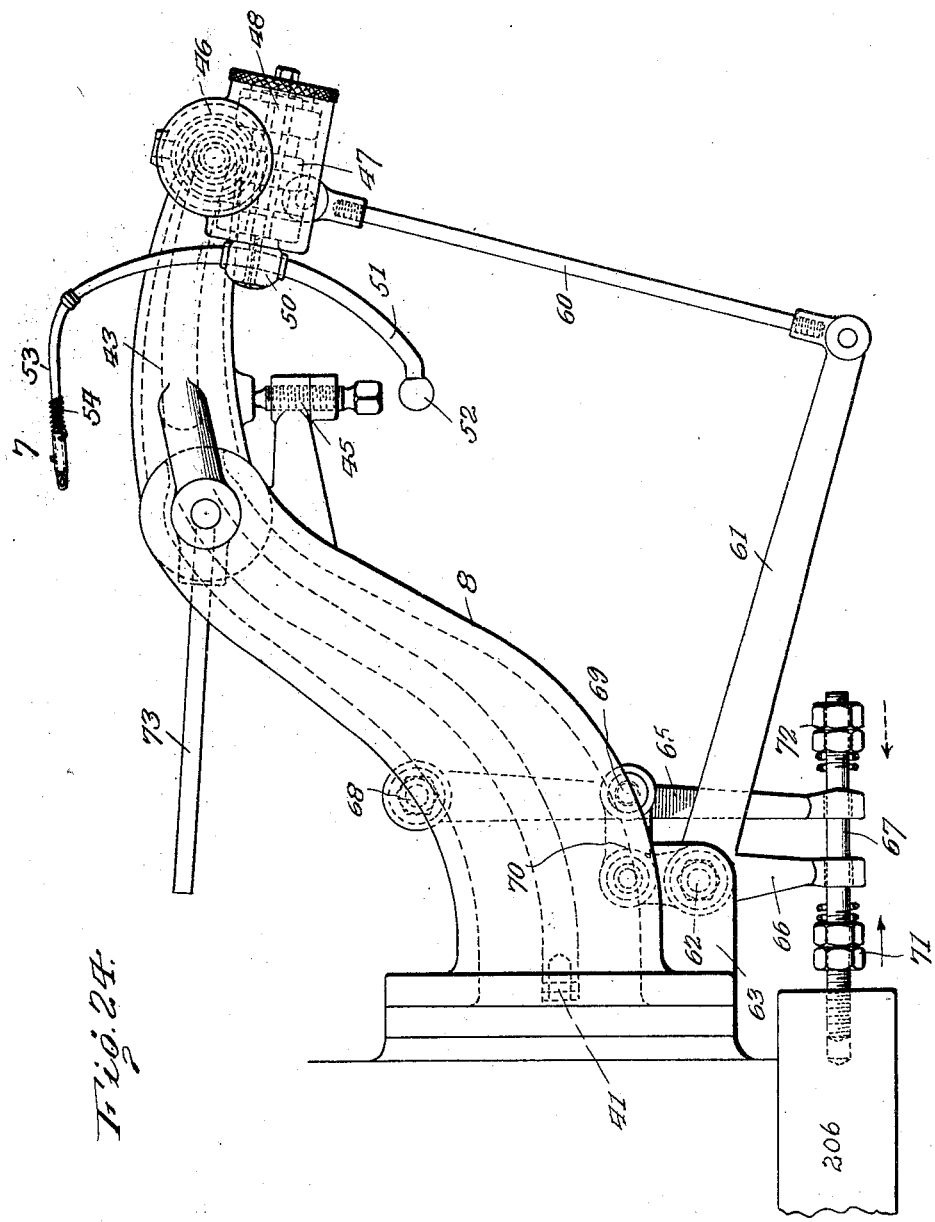

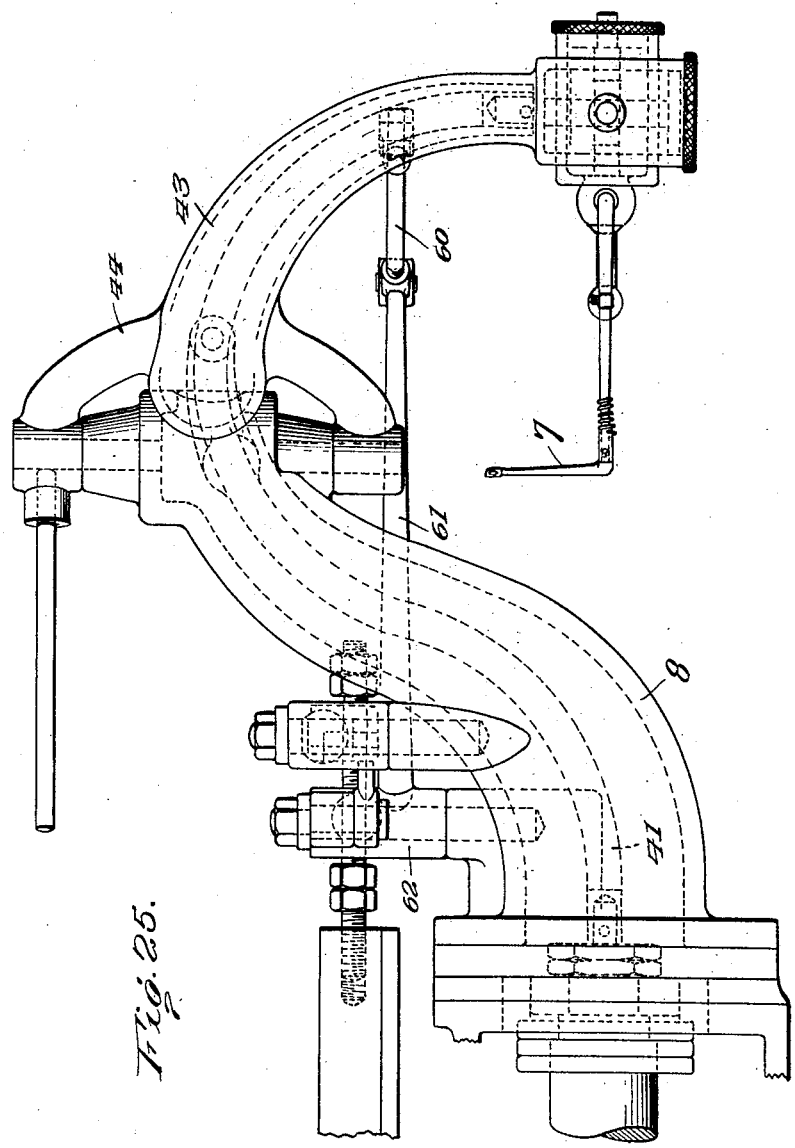

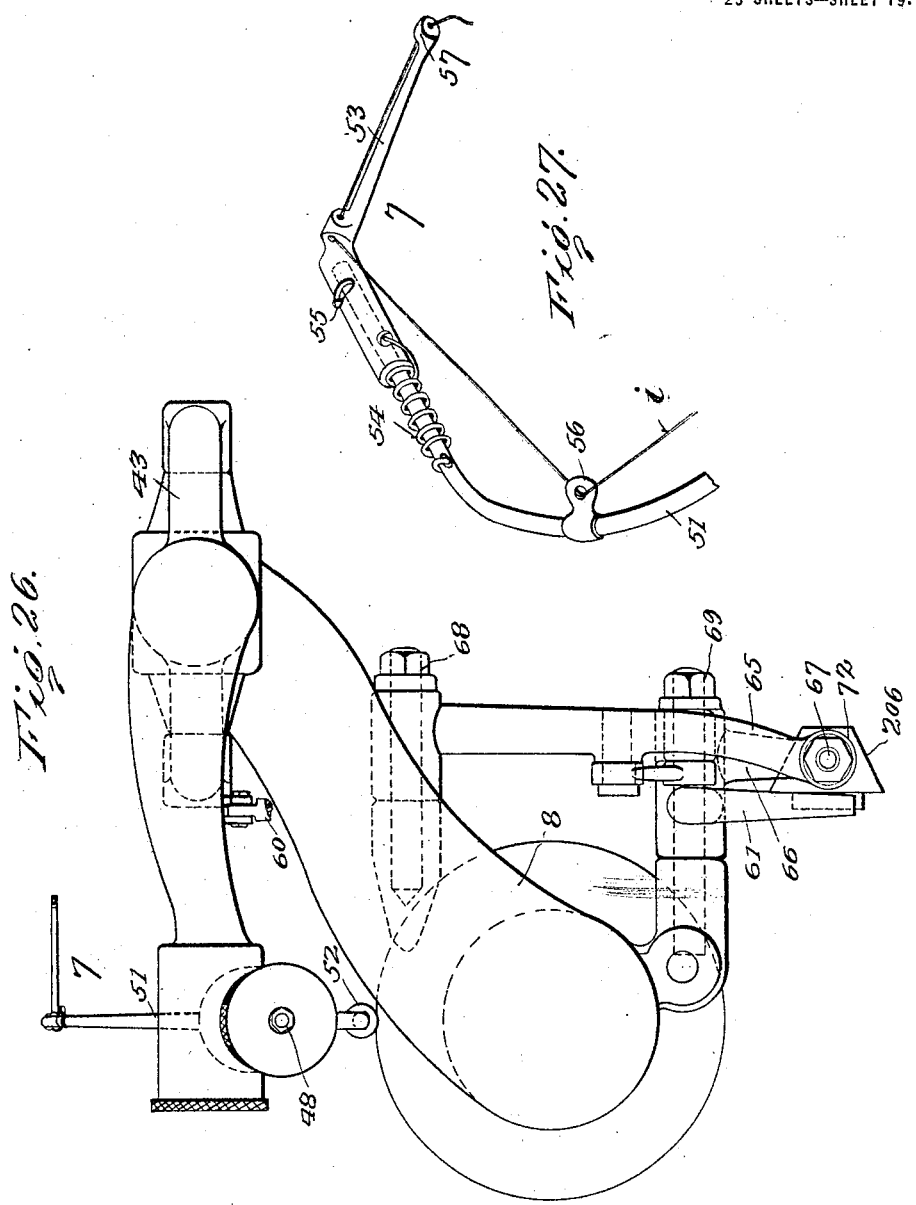

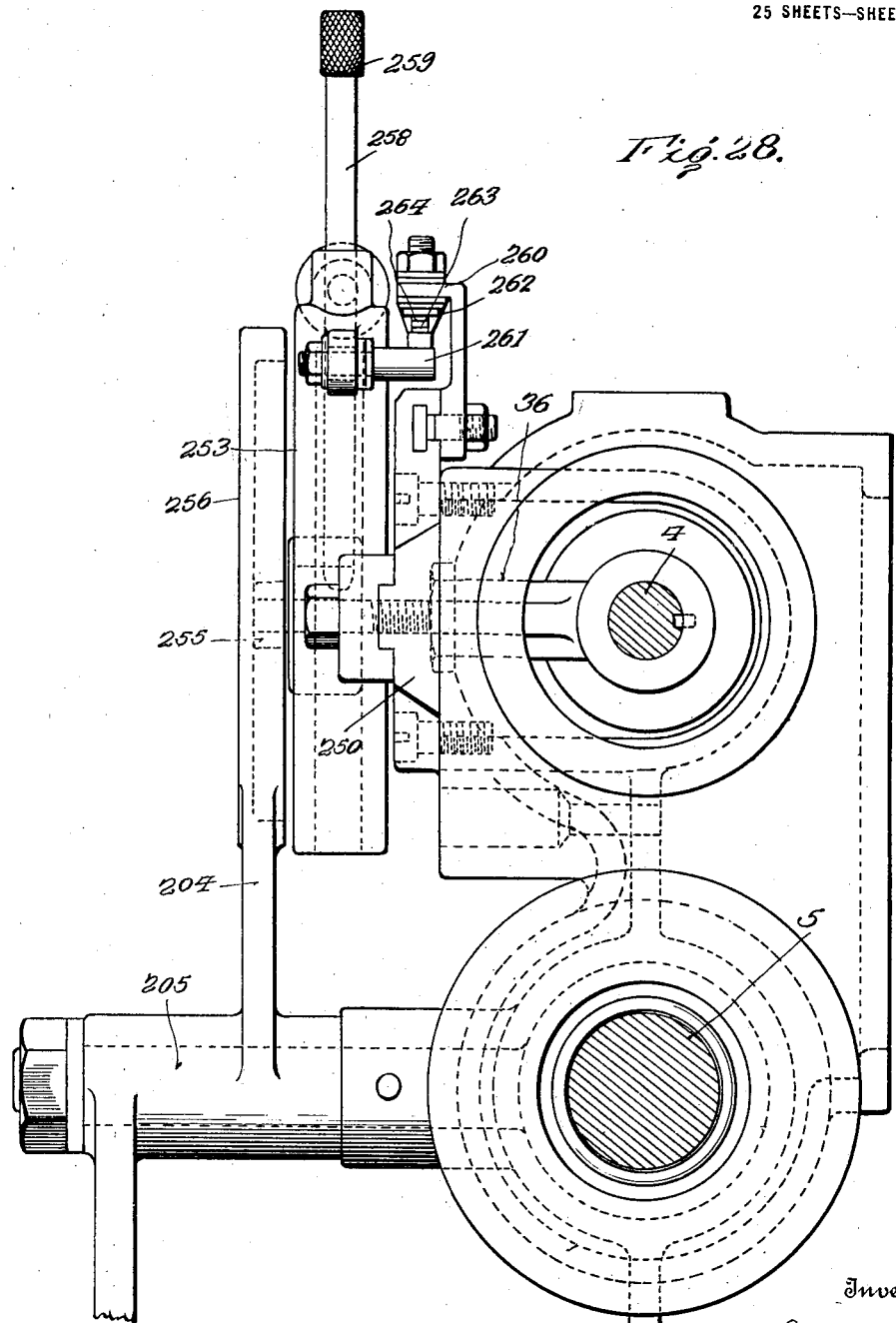

F. W. COTTERMAN.
WINDING MACHINE.
APPLICATION FILED AUG. 23, 1916.
1,377,808.
Patented May 10, 1921.
25 SHEETS—SHEET 21.
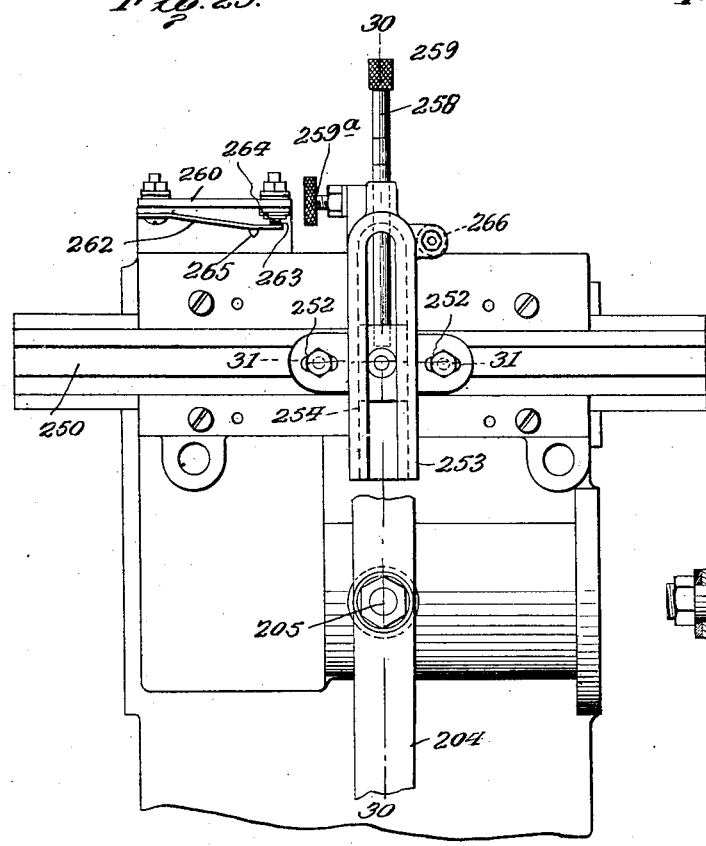
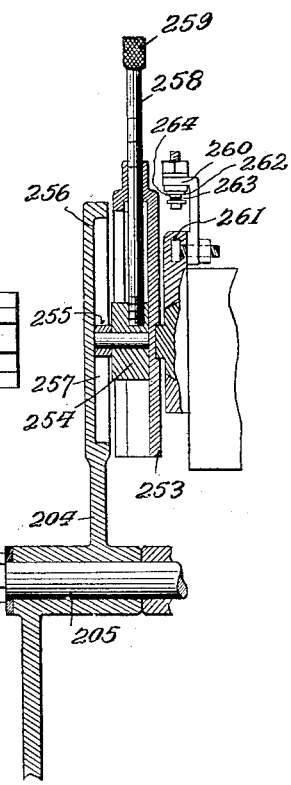
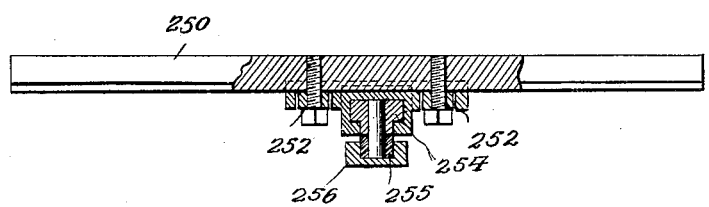

F. W. COTTERMAN.
WINDING MACHINE.
APPLICATION FILED AUG. 23, 1916.

1,377,808.

Patented May 10, 1921.
25 SHEETS—SHEET 22.

Inventor
F. W. Cotterman
By Sturtevant Moore
Attorneys

Witnesses

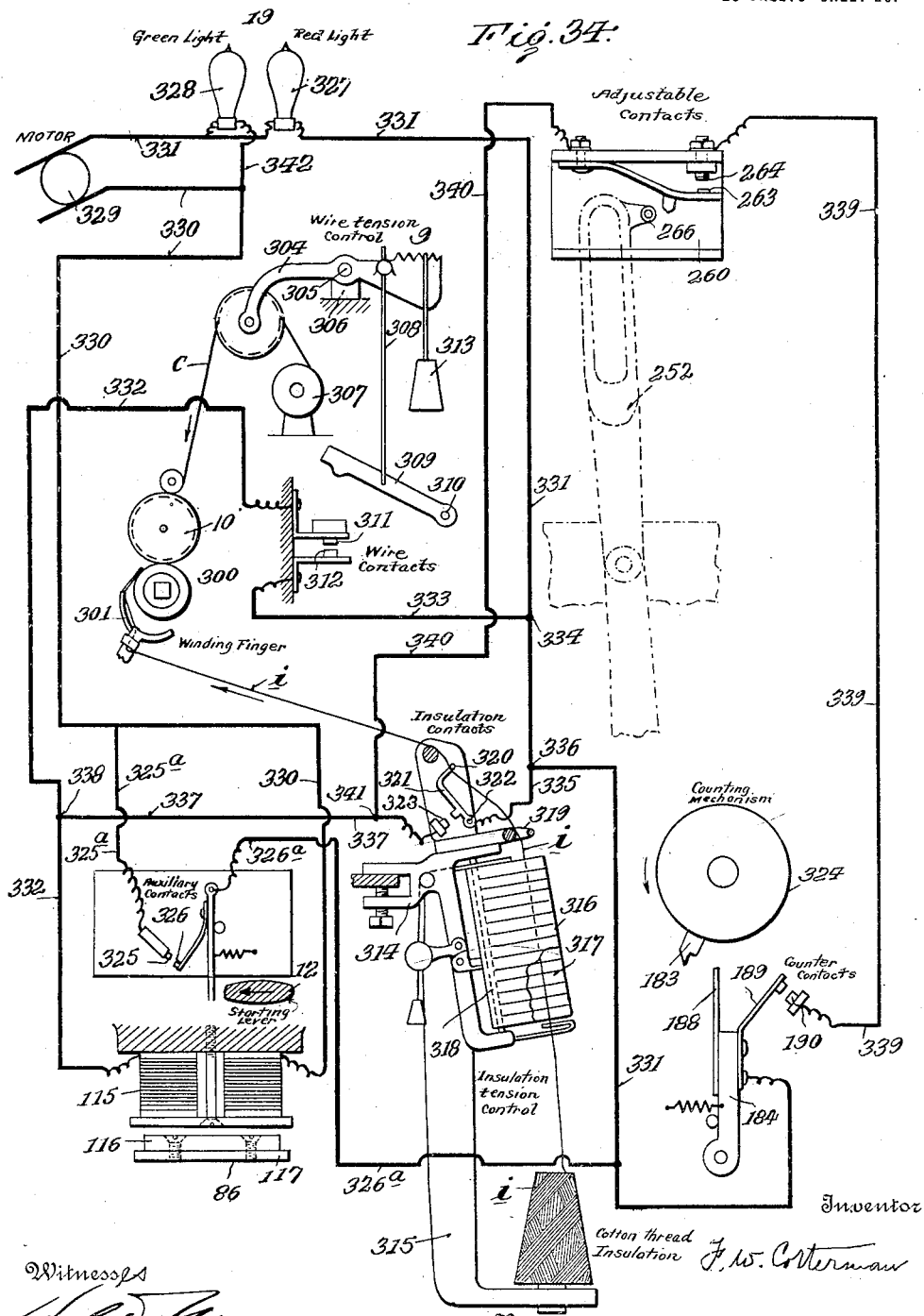

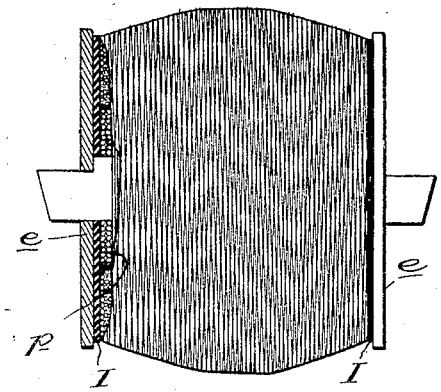
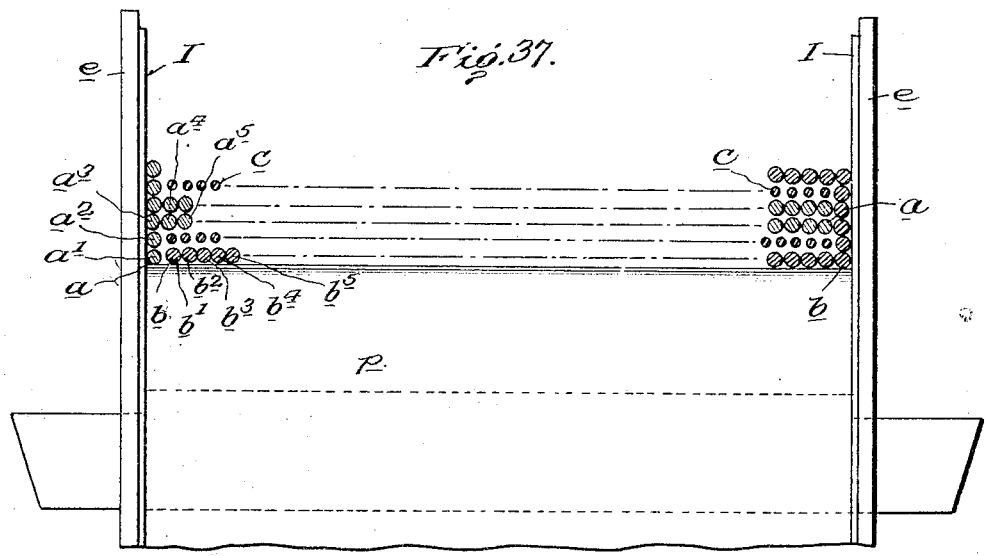
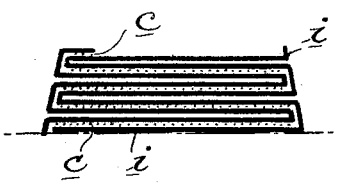

UNITED STATES PATENT OFFICE.

FREDERICK W. COTTERMAN, OF DAYTON, OHIO, ASSIGNOR TO SPLITDORF ELECTRICAL COMPANY, OF NEWARK, NEW JERSEY, A CORPORATION OF NEW JERSEY.

WINDING-MACHINE.

1,377,808.   Specification of Letters Patent.   Patented May 10, 1921.

Application filed August 23, 1916. Serial No. 116,479.

*To all whom it may concern:*

Be it known that I, FREDERICK W. COTTERMAN, a citizen of the United States, residing at Dayton, in the county of Montgomery, State of Ohio, have invented certain new and useful Improvements in Winding-Machines, of which the following is a description, reference being had to the accompanying drawing and to the figures of reference marked thereon.

This invention relates to certain new and useful improvements in motor-operated winding mechanisms.

The primary object of the present invention is to produce a machine for successfully applying the secondary winding of an electric high tension coil and the like.

In practice at the present time the winding of the secondary coil is dependent upon the skill of an operator, who, after each layer of the fine wire has been laid, stops the winding spindle and applies a layer of suitable insulating material.

This invention has for an object the overcoming of this tedious present method, by producing an automatic winding machine in which the wire and insulating material are applied simultaneously in layers.

Another object of the present invention is the production of an automatic winding mechanism including among other things means for counting the number of layers desired and automatically stopping the machine when that number is reached; means for gradually reducing the length of the successive layers during the winding process; means for adjusting the length of the layers with relation to the size of wire used; adjusting means for different size wires and the spacing thereof; means for stopping the machine and indicating such stoppage should the wire or insulating material break; and other associated driving and regulating means hereinafter set forth.

The present invention further consists in the arrangement and combination of the several mechanisms and parts hereinafter described and claimed.

In the drawings,—

Figure 2:
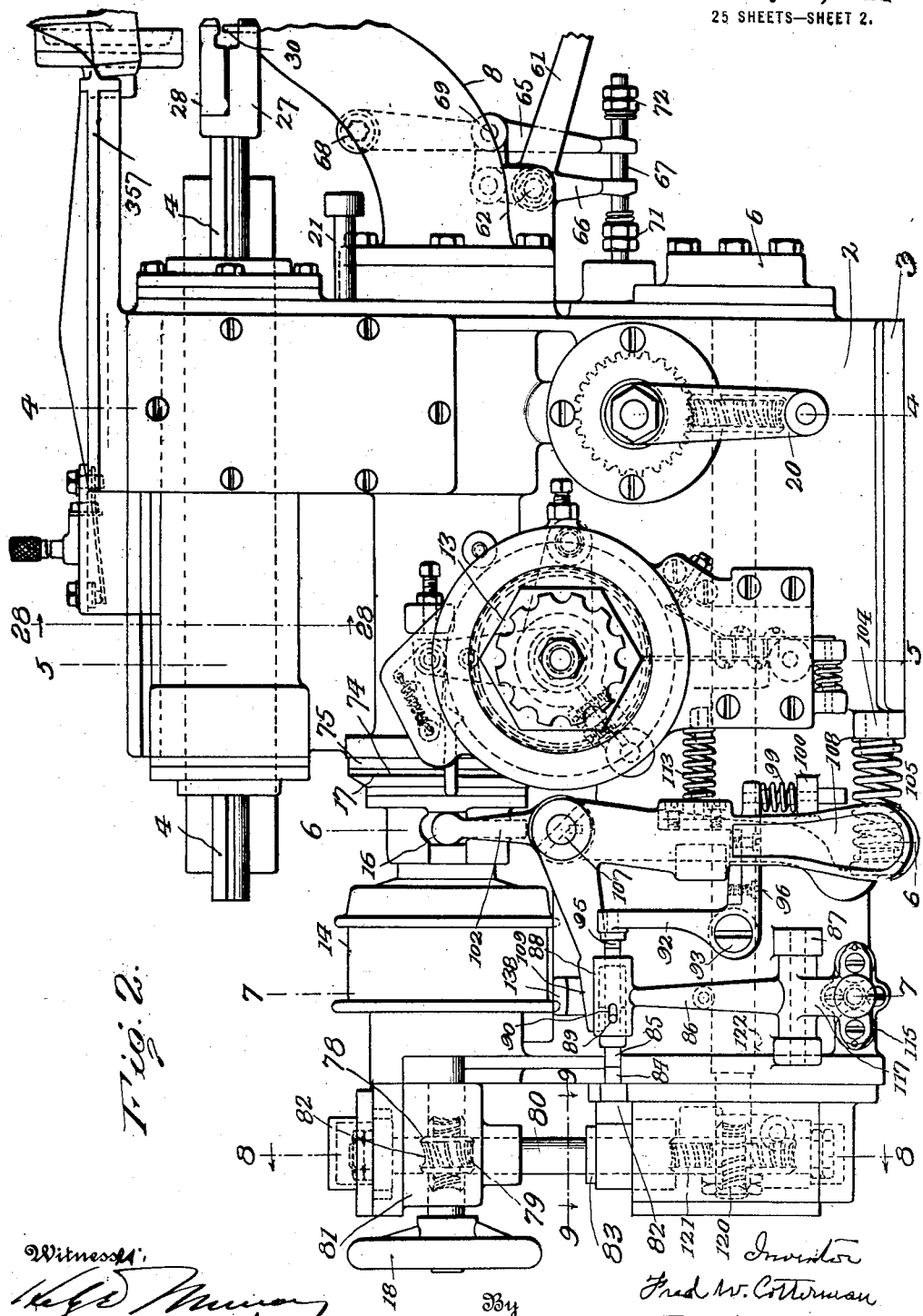
Fig. 2 is a side elevation looking from the starting side of the machine.
Figure 9:
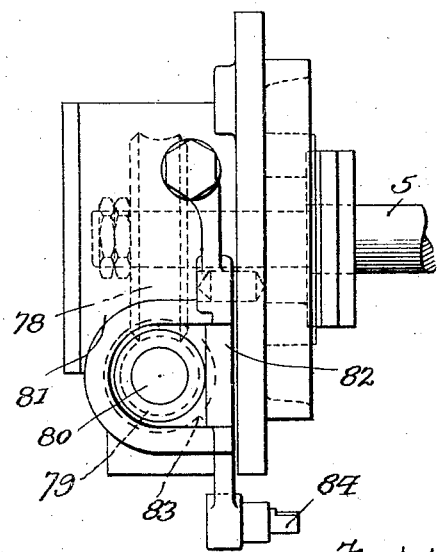
Figure 32:
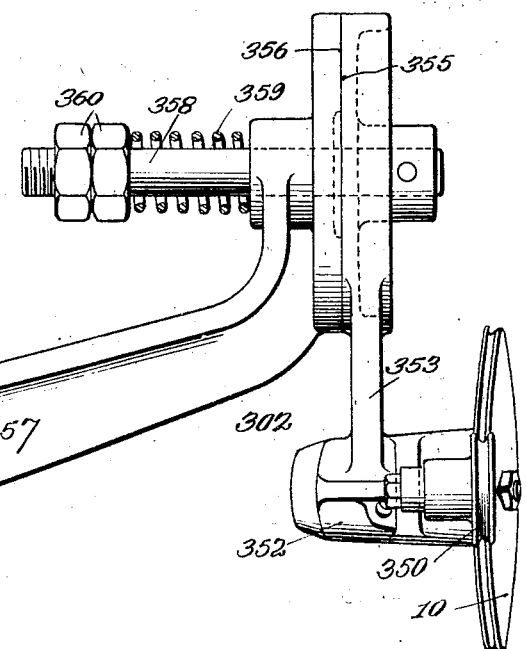
Figure 33:
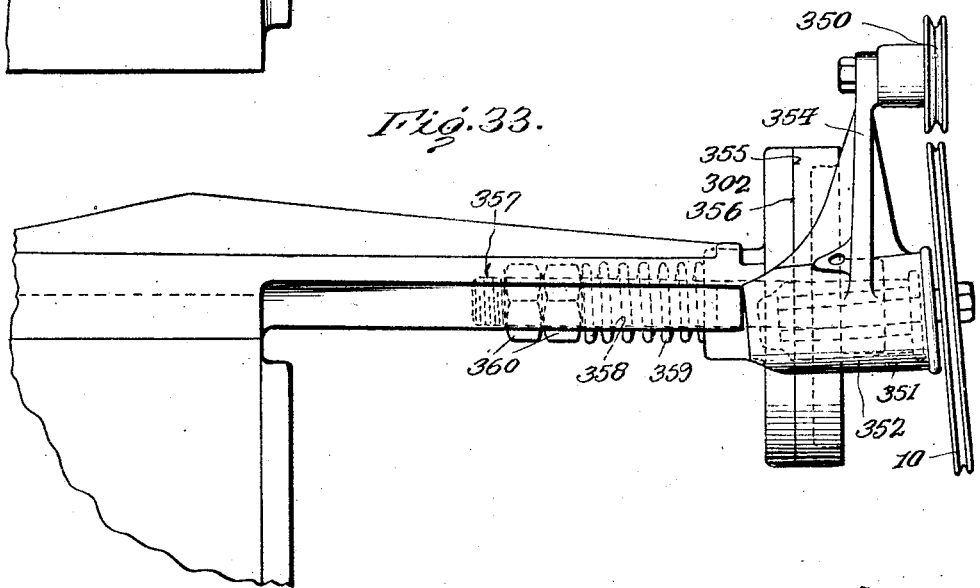
Figure 36:
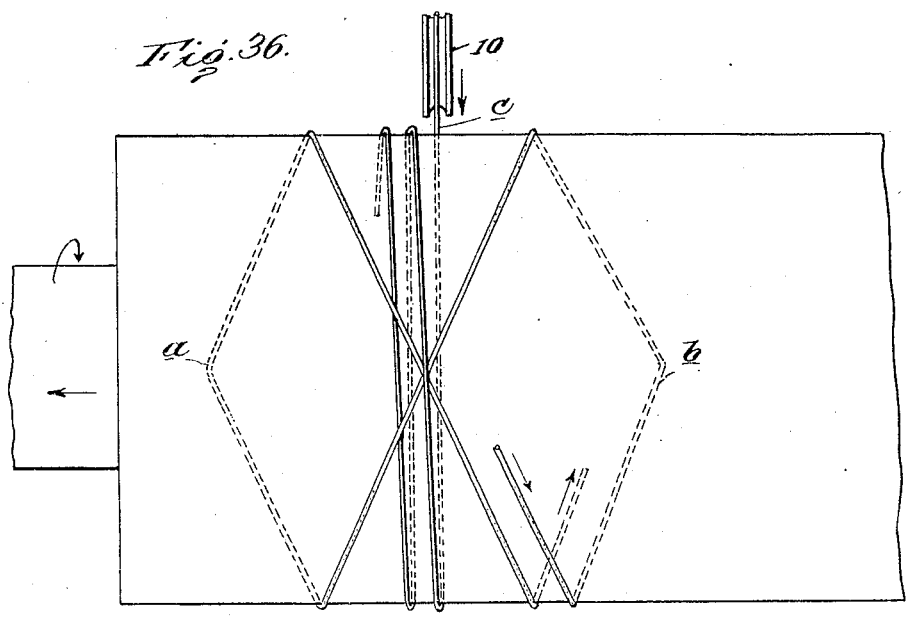
Figure 35:
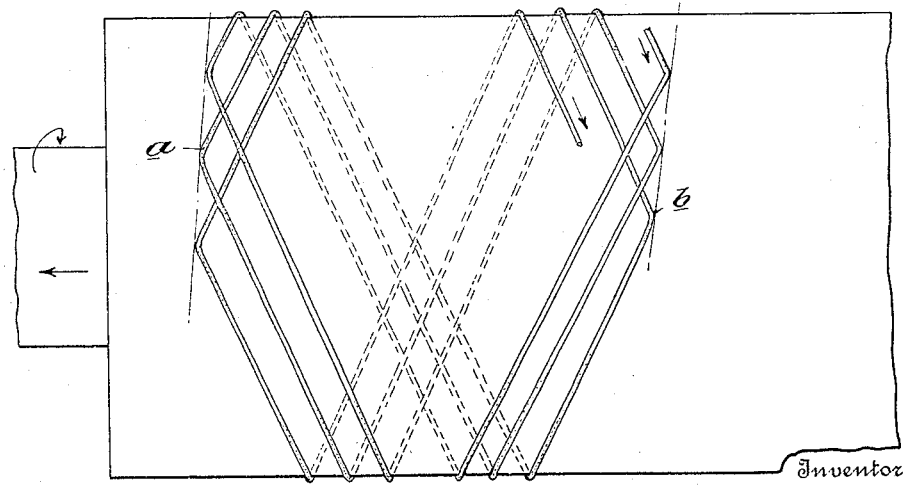

Figs. 5, 6, 7 and 8 are similar views on the lines 5—5, 6—6, 7—7 and 8—8, respectively of Fig. 2;

Fig. 9 is a detail horizontal sectional view on the line 9—9 of Fig. 2;

Fig. 10 is a horizontal sectional view on the line 10—10 of Fig. 11;

Fig. 11 is a detached view of the cam shaft mechanism including the reversible transmission and spiral cam;

Figs. 12, 13 and 14 are detail cross sectional views on the lines 12—12, 13—13 and 14—14 of Fig. 11, respectively;

Fig. 15 is a perspective view looking from the opposite side of the machine, illustrating the reversing mechanism, winding slide and adjustable contacts;

Fig. 16 is a side elevation of the reversing mechanism and other associated mechanism shown in plan view in Fig. 10;

Fig. 17 is an enlarged side elevation of the starting lever and the associated mechanism for stopping the machine;

Fig. 18 is a detail plan view of the eccentrically driven lever for actuating other mechanism in stopping the machine;

Fig. 19 is an enlarged detail transverse sectional view of a portion of the machine, showing the starting lever and other associated mechanism of Fig. 13 in end elevation;

Fig. 20 is an enlarged detail side elevation of the counting mechanism for regulating the number of layers of material wound;

Fig. 21 is a top plan view of the counting mechanism shown in Fig. 20;

Fig. 22 is a transverse sectional view through the counting mechanism shown in Figs. 20 and 21;

Fig. 23 is a sectional view on the line 23—23 of Fig. 22 through the brake or retarding strap for preventing overthrowing of the counting ratchet;

Fig. 24 is an enlarged side elevation of the winding mechanism and winding finger, showing the mechanism for tilting the winding finger at each end of each layer;

Fig. 25 is a top plan view of the winding mechanism shown in Fig. 24;

Fig. 26 is an end elevation of the winding mechanism shown in Figs. 24 and 25;

Fig. 27 is a detail perspective view of the winding finger;

Fig. 28 is a sectional view on the line 28—28 of Fig. 2, showing the winding slide mechanism and the adjustable contacts for regulating the width of the last layer wound;

Fig. 29 is a detail side elevation of the winding slide mechanism, showing the adjustable contacts in an adjusted position at one end of the supporting and guiding frame;

Fig. 30 is a vertical sectional view on the line 30—30 of Fig. 29 through the winding slide mechanism and the adjustable means for regulating the spacing of the wire and the relative reciprocation of the winding spindle;

Fig. 31 is a horizontal sectional view on the line 31—31 of Fig. 29;

Fig. 32 is a plan view of the guiding rollers of the wire-feeding mechanism for directing the wire to the coil;

Fig. 33 is a side elevation of the guide rollers shown in Fig. 32;

Fig. 34 is a diagrammatic view illustrating in an electrically connected circuit the several mechanisms of the machine;

Fig. 35 is an enlarged diagrammatic illustration of a few of the continuous series of the spirally wound insulating "figure eights" applied to the coil in the nature of a traveling band or tape;

Fig. 36 is an enlarged diagrammatic view illustrating the manner in which the wire of the secondary coil is interposed between the layers of insulation, a single "figure eight" thereof being shown, together with the wire wound and resting on one of the crossings of the insulation thread formed in the "figure eights";

Fig. 37 is an enlarged sectional diagrammatic view through a portion of a high tension coil, illustrating the manner in which the edges of the traveling band of "figure eights" build up at each end and between the layers of the wire, one edge of said band being shown with light section lines, and the other edge thereof being shown in heavier section lines, for purposes of clearness;

Fig. 38 is a diagrammatic view illustrating the manner in which the layers of wire and insulation are wound, and also the successive reducing of the length of the layers, or the "pyramiding" thereof; and Fig. 39 is a view of a high tension coil partly in section and showing conventionally the secondary winding applied thereto.

The herein described machine has been primarily designed for the purpose of applying the secondary winding to a high tension coil of a magneto, but it will be readily understood that it can be used for such other purposes as properly fall within its range of adaptability.

In the construction of a high tension coil for a magneto, it is usual to first apply the primary winding about the core. This primary winding consists of a suitably covered or insulated wire, which is wound to a certain number of layers. The length of this winding need not be so great as to produce a cumbersome primary winding, and as a consequence the necessary thickness of the covering or insulating material about this primary winding can be used to advantage.

This, however, does not apply to the secondary winding of a high tension coil, in which it is not unusual to apply upward of a mile of wire. The wire of the secondary winding is of a very fine enameled gage, in order that a suitable length can be applied about the primary winding without rendering the coil clumsy or cumbersome. Between each layer of the wire of the secondary winding, it is necessary to interpose a layer of insulating material, which in the present case consists of a cotton thread.

In the present design, the secondary winding wire and insulating thread are applied simultaneously about the primary coil in layers. The insulating thread is applied in substantially a continuous band of "figure eights" spirally wound from one end of the coil to the other, the "crossings" of the thread in each figure eight (of which there are approximately sixteen to twenty in a distance of .004 of the coil) serving to form a surface on which the wire which is being applied in interposed relation with the insulating thread rests, sufficiently spaced and insulated from the preceding layer.

At each end of the coil for a short distance as each layer of the secondary winding is applied, the insulating thread is wound in substantially a vertical plane, thereby insuring insulation of the layers of the fine wire up to the very end of each layer thereof.

In the building up of these layers of the secondary winding it has been found advantageous to shorten each succeeding layer of wire and insulating thread, allowing the secondary winding to assume somewhat the shape of a portion of a sphere, or as will be termed herein, a form of "pyramiding" from the outer edges of the layers toward the center thereof. When a number of predetermined layers have been wound, the machine is automatically stopped, the coil removed from the machine and further treated in the usual manner.

The present invention comprises among other things, several coöperatively interconnected mechanisms, each of which will be hereinafter described in detail. These mechanisms include an insulation feeding device; a rotating winding spindle reciprocally mounted in the upper portion of the casing and to which the coil with the primary winding thereon is attached; a cotton thread insulation winding mechanism and revolving finger angularly disposed with relation to the coil to coöperate with the winding spindle in applying the band of "figure eights," and capable of being tilted to wind the thread in a substantially vertical plane at each end of the coil after laying each layer; a wire-feeding device having a guiding pulley relatively located with relation to the winding finger for interposing and laying the wire upon the "crosses" of thread formed in the "figure eights;" a driving shaft mechanism through which the power is transmitted to the machine provided with a suitable clutch and brake, and the usual drag for use in starting the machine to prevent the breaking of the thread or wire; a starting mechanism and an automatic stopping mechanism including a lever controlled by electric contacts on the counting mechanism and other adjustable contacts and operated by an eccentrically driven reciprocating pin operated from the drive shaft; a cam shaft mechanism provided with a reversible transmission connection adapted to revolve a spirally arranged cam groove first in one direction and then in the reverse direction, and in so doing oscillate an intermediately pivoted lever connected to a slide carrying a roller on the lower end thereof, and in turn reciprocating the winding spindle to which the upper end of the said pivoted lever is connected; a reversing mechanism adapted to operate the reversible transmission; a counting mechanism for applying a predetermined number of layers, provided with electrical contacts for closing a circuit and stopping the machine when a correct number of layers have been reached; a resetting device included in the counting mechanism; an adjustable pyramiding mechanism for successively shortening the layers of the coil and interconnected with and operated by the counting mechanism; a winding slide mechanism for adjusting the reciprocating movement of the winding spindle with relation to the gage wire used and the spacing thereof on the coil; and an indicating device consisting of suitable lights connected in the electrical circuit of the several mechanisms.

*General description.*

Figure 1:
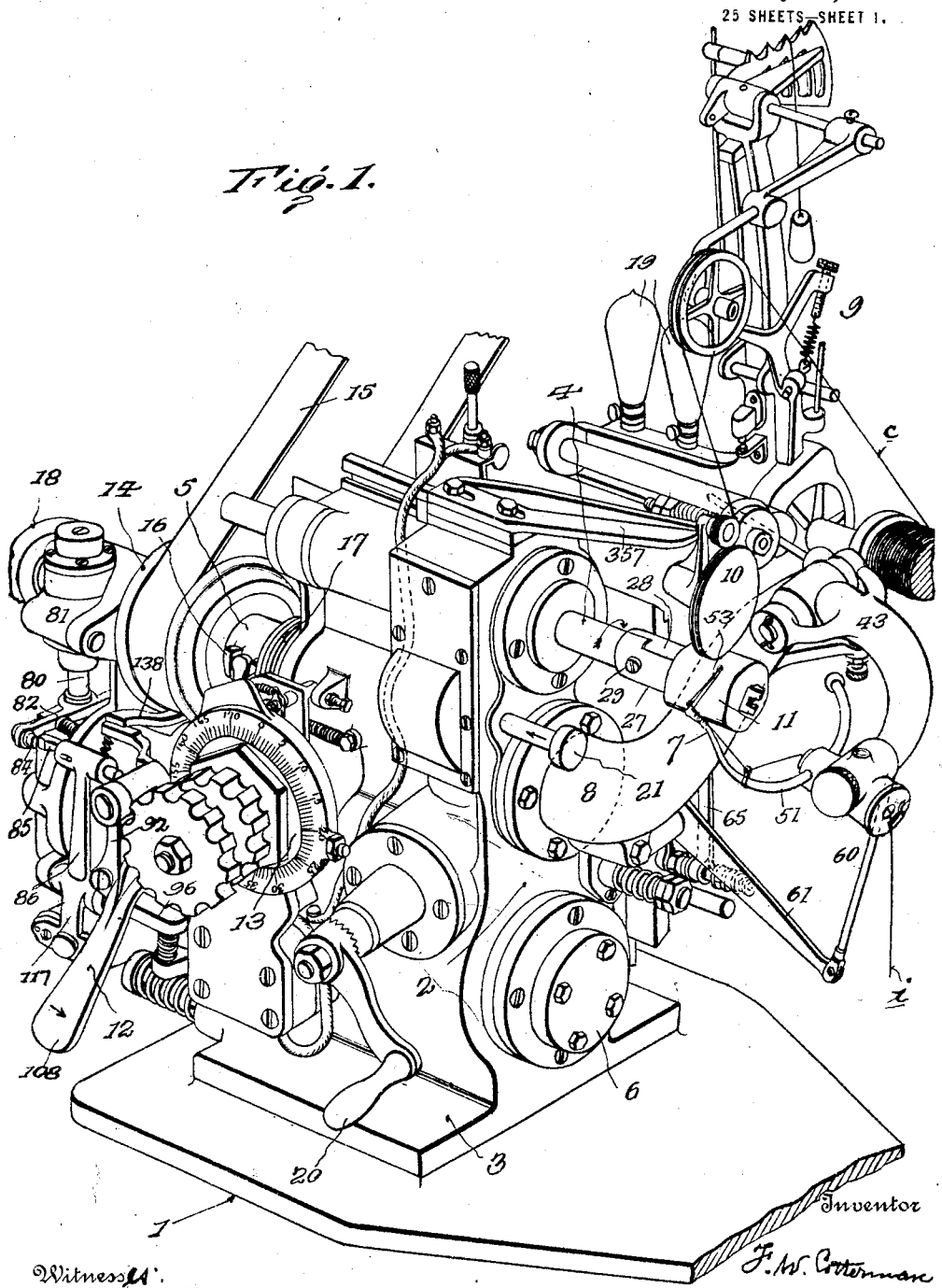
Figure 1 is a perspective view of my improved winding machine.

Referring to the drawings and more especially to Fig. 1, the machine is mounted upon any suitable support 1 and comprises a casing 2 having a base 3. The casing 2 has positioned therein in longitudinal superimposed relation, the winding spindle 4, the driving mechanism and shaft 5, and the cam shaft mechanism contained in the lowermost portion of the casing between the end bearings 6. The insulation winding finger 7 receives motion from a flexible shaft connected to the driving shaft and extending through the offset bracket 8, secured to one end of the casing 2. The insulation is fed from any well known form of tensioning device, hereinafter described in connection with the electrical diagram shown in Fig. 34.

The wire-feeding device 9 is positioned to one side of the casing 2, and directs the wire over the pulley 10 around the coil indicated at 11. This feeding device may be of the usual form, and will be later referred to in connection with the electrical diagram shown in Fig. 34.

The starting lever 12 is provided near one end of the machine. The counting and resetting mechanism 13 is located on one side of the casing 2 and extends therethrough to the pyramiding mechanism on the opposite side of the machine. The reversing mechanism and winding slide are also located on the opposite side of the machine.

The driving pulley 14 is carried by the shaft 5 and is operated by a belt 15 connected to a motor or other suitable source of power. A clutch 16 and brake 17 are shown in Fig. 1, to one side of the drive pulley 14, and the drag hand wheel 18 is also shown on the extreme end of the shaft 5.

The indicating signal lights 19 are shown mounted on a suitable bracket above and to one side of the casing 2. A hand-operated lever 20 adapted to reciprocate the coil when disconnected from the power feeding mechanism and an operating rod 21 is also provided for allowing the winding spindle 4 to be rotated independently of the driving shaft 5.

*Design of secondary winding in applying "figure eights" around and interposing wire simultaneously.*

Referring to Figs. 35 to 39 inclusive of the drawings, the spirally wound band of "figure eights" is formed by the reciprocating and rotary movement of the winding spindle and the rotation of the winding finger at an angle and in an opposite direction to that of the winding spindle.

These "figure eights" are best illustrated in Fig. 35 of the drawings, in which one side of the band is indicated at *a* and the opposite side of the band is designated by the letter *b*. As shown, there are three "figure eights" here represented, among which are formed a plurality of circumferential "crossings."

In the present machine there are sixteen to twenty of such circumferential spirally formed crossings in a longitudinal distance of about .004 of the coil upon which the wire rests, a different crossing point being had on each revolution.

Referring to Figs. 36 and 37 of the drawings, the manner of building up the layers, and more especially the relation of the edges

*a* and *b* of the spirally wound band of "figure eights" and the wire *c*, is shown.

The coil 11 is provided with the primary winding *p* between the usual ends *e* and insulation *i*. As has been hereinbefore mentioned, the winding finger is tilted into a substantially vertical winding plane at each end of the layers during the winding operation, thereby preventing the formation of "figure eights" at these points. The edges *a* and *b* of the band, therefore, assume the following relative positions on each revolution; that is to say, as *a'* is applied, *b'* is wound; as $a^2$ is applied, $b^2$ is wound; as $a^3$ is applied, $b^3$ is wound, $a^4$, $b^4$, $a^5$, $b^5$; and so on, the winding finger 7 having by this time assumed its angular position and the process of forming "figure eights" continues until the opposite end of the layer is reached, where the edges *a* and *b* of the band are now reversely built upon themselves in a similar manner to that just described, during the tilting of the winding finger to substantially a vertical position, whereupon the reversing of the winding spindle in its reciprocating movement takes place and another layer of "figure eights" is applied. Thus it will be seen that the edges *a* and *b* of the band, as they are spirally wound back and forth, interpose layers of insulation between the wire as diagrammatically illustrated in Fig. 37 of the drawings.

During the formation of this band of "figure eights" the wire *c* is applied as indicated in Fig. 36 of the drawings. The guide pulley 10 is in close proximity to the path of travel of the winding finger 7 and during every revolution thereof there is applied a turn of wire. The wire is interposed between the edges of the band of the figure eights" and rests on the "crossings" formed therebetween. As has been heretofore mentioned, there are upward of sixteen to twenty of these crossings in a longitudinal distance of about .004 of the coil, and as a result a sufficient and readily applied insulating layer of cotton thread is provided between each layer of wire.

*Insulating winding mechanism.*

Referring to Figs. 1, 2, 3, 24, 25, 26 and 27, the insulating winding mechanism comprises a rotating, reciprocating, winding spindle 4, mounted in suitable bearing heads 25, and provided at one end with a chuck 26 adapted to receive and rotate the coil 11. The chuck consists of clamping jaws 27 and 28 and binding screw 29. The projecting rib or stud 30 is formed on the jaw 27 and engages the usual recess between the forked end of the core of the usual coil, so as to insure its rotation and reciprocation with the winding spindle.

Figure 4:
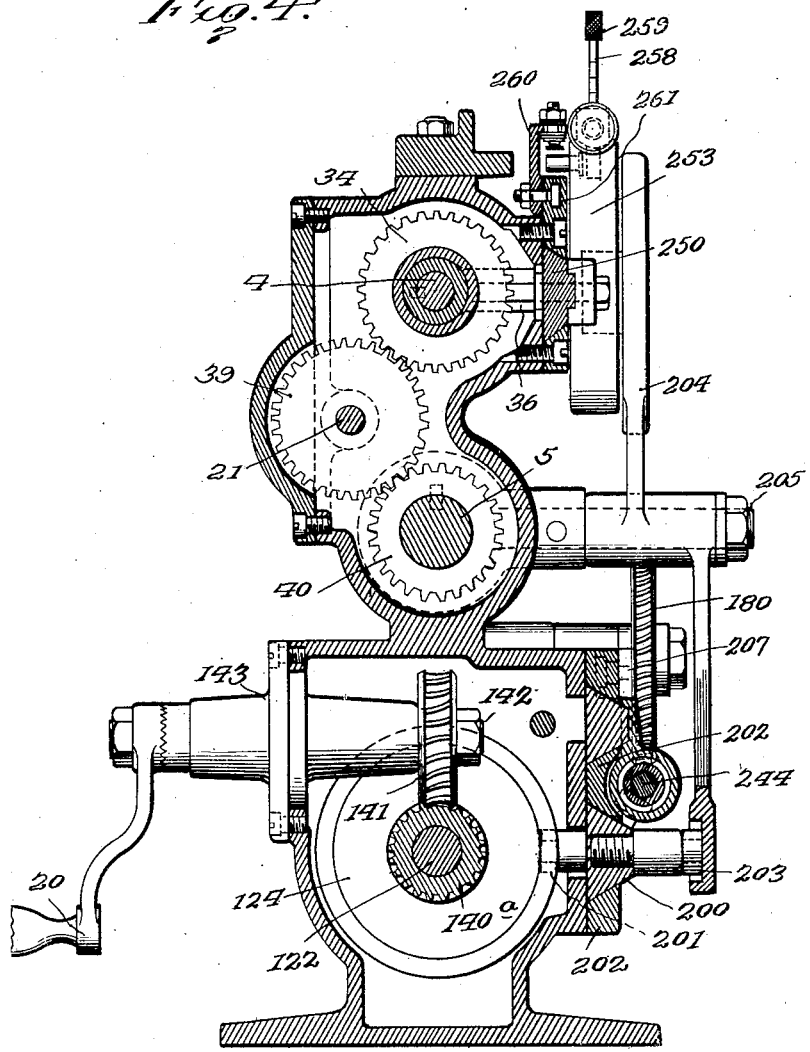
Fig. 4 is a transverse vertical sectional view on the line 4—4 of Fig. 2.
Figure 5:
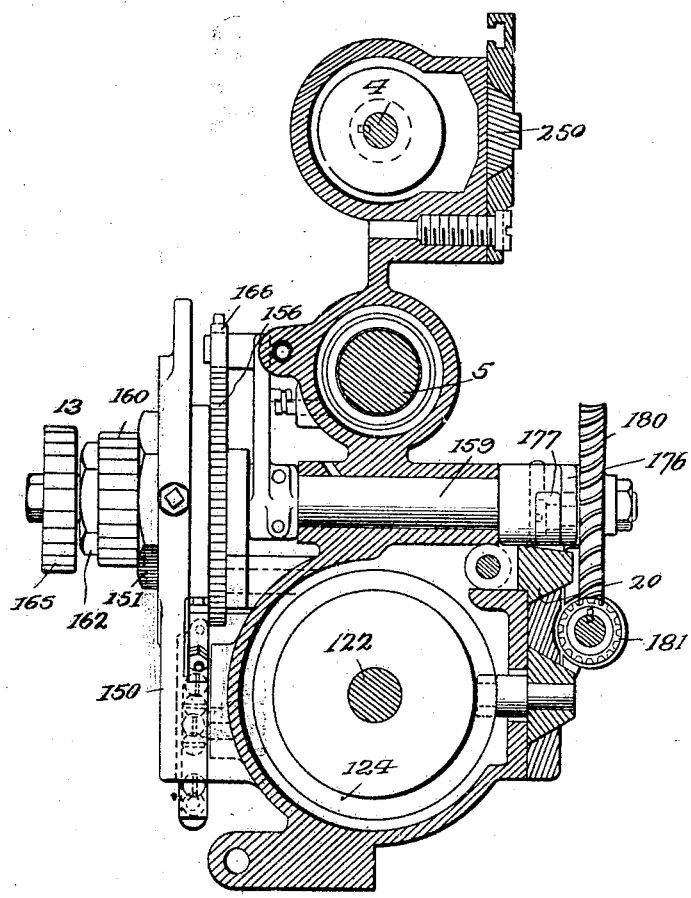
Figure 6:
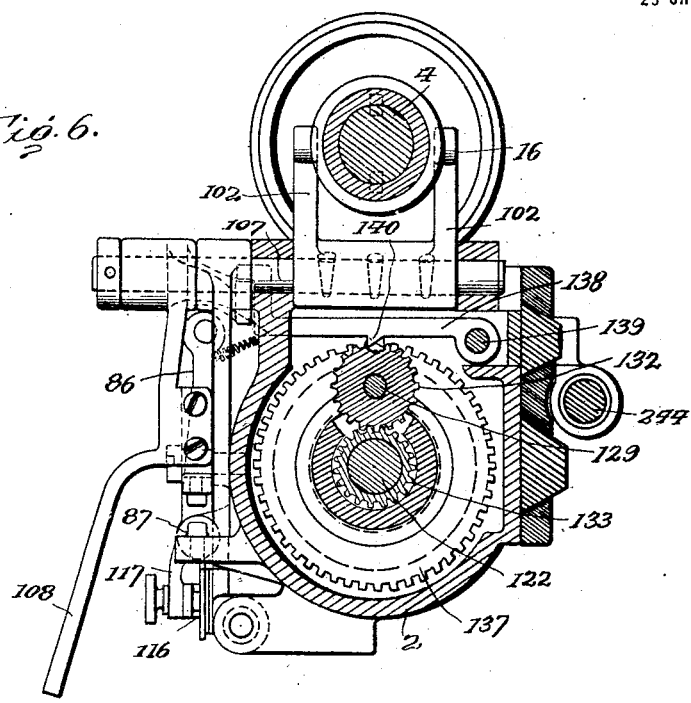
Figure 7:
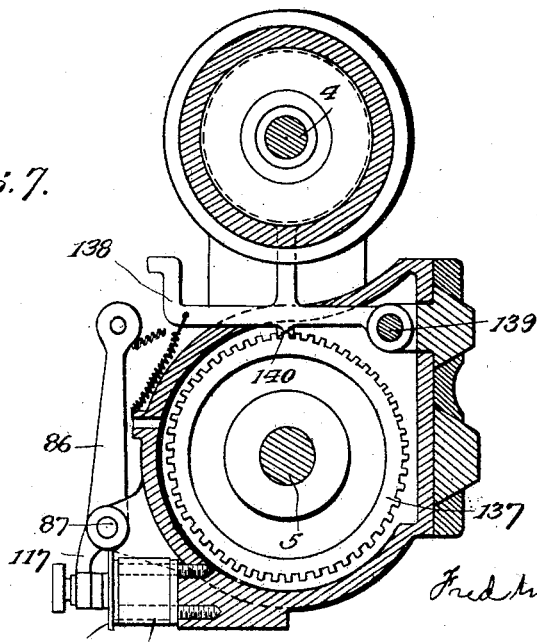
Figure 8:
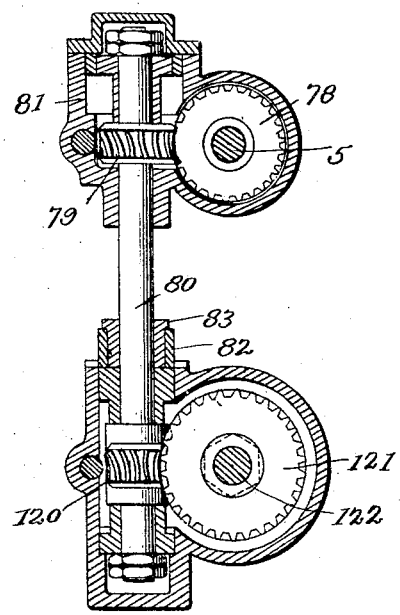

The winding spindle 4 is provided with a keyway 31 which receives a key 32 carried by a sleeve 33 fitted and keyed into a gear 34. By this construction, the spindle is free to reciprocate through the gear and at the same time be rotated by it. The spindle 4 is further provided with suitable collars 35, between which the end of an arm 36 (Figs. 4, 16 and 28) extends. This arm 36 is carried by a slide 250 of the winding slide mechanism which is reciprocated by a lever connection 204, to be hereinafter described. Through this connection, the winding spindle receives its reciprocatory movement. The rotation of the winding spindle is obtained through the gear 34 meshing with a shiftable gear 39 operated by the rod 21.

The shiftable gear 39 meshes with a wide gear 40 keyed to the driving shaft 5. The purpose of this wide gear is to permit the shiftable gear 39 to be moved laterally in mesh therewith and permit the winding spindle to be rotated by hand for the purpose of putting on the first few turns of the coil.

The mechanism for transmitting the power from the drive shaft 5 to the winding finger 7 comprises a flexible shaft 41 connected to the drive shaft 5 at 42. The flexible shaft 41 extends through an opening in the bracket 8 secured to one end of the casing 2 and continues through a pivoted bracket 43 connected to the bracket 8. The pivoted bracket 43 is mounted on the bracket 8 through the pivotal yoke connection 44. An adjustable stop 45 is provided beneath the pivoted bracket 43 and limits the downward swing of said bracket, thereby regulating the width of the band of "figure eights," (see Fig. 24).

Keyed to the end of the flexible shaft extending through the bracket 43 is a worm 46, adapted to mesh with a gear 47 keyed to the spindle 48 of the winding finger 7. These worm-gears 46 and 47 are housed in a suitable casing 49 at the extreme end the bracket 43. The spindle 48 of the winding finger 7 is tubular, and at its inner end is provided with an enlarged head 50, through which the main arm 51 of the winding finger passes. The winding arm 51 is arcuate in shape, and at one end is provided with a suitable balancing knob 52. At its other end the said arm 51 is provided with a spring finger 53, the purpose of which is to permit the laying of the insulating thread at the proper point on the coil (see Fig. 27). The spring 54 and pin-and-slot connection 55 constitute this spring connection. Suitable thread-guides 56 are carried by the arm 51 and a thread-guide 57 is provided on the spring finger 53 for placing the insulation around the coil.

The normal position of this winding finger 7, and more especially the spring-finger 53 and guide 57, is angular with respect to the longitudinal alinement of the coil, the purpose of which is to facilitate the forming of the hereinbefore mentioned "figure eights."

As has been heretofore mentioned, the winding finger 7 is tilted into substantially a vertical plane at each end of the coil. The mechanism for effecting this tilting of the winding finger will now be described.

Secured to and dependent from the pivoted bracket 43 is a link 60, to the lower end of which is pivotally connected a pivoted arm 61. The arm 61 is provided with a sleeve and is pivoted at 62 on suitable brackets 63 extending from the bracket 8. The arm 61 is rocked on its pivotal connection through a plurality of levers operated by a slide 206 connected to the reversing mechanism hereinafter described. These levers comprise a depending arm 65 and a shorter depending arm 66, through the lower end of which passes a rod 67 adjustably mounted in the slide 206. The lever 65 is pivoted at 68 to the bracket 8. The lever 66 is a part of the lever 61 and is pivoted on the pivotal connection 62. Secured to the lever 65 at 69 is a link connection 70, which is adapted to transmit motion from the said lever to the arm 61.

By this construction, it will be seen that as the sliding arm 206 moves in the direction of the arrow shown in full lines in Fig. 24, the nuts 71 will engage the lower end of the lever 66 and rock the same upon the pivot 62. The lever 66 is a part of the arm 61 and as the said lever 66 is rocked, the arm 61 will correspondingly move, and through the link connection 60 the winding finger 7 tilt to a substantially vertical revoluble position. When the sliding arm 206 is moved in the direction of the arrow shown in dotted lines in Fig. 24, the lower end of the lever 65 will be engaged by the nuts 72, and by reason of the link connection 70 connected to the said lever 65, the said arm 61 will be moved and through the link connection 70 tilt the winding finger 7 to a substantially vertical position at the opposite end of the coil. A hand-operated arm 73 is also provided on the bracket 43 for tilting the winding finger at other times. Springs may be interposed between the ends of the levers 65 and 66 and the nuts 71 and 72 for yieldingly transmitting this movement.

From this construction it will be seen that as the layers of insulating material are laid on the coil, which is reciprocated on the winding spindle, the proper number of "figure eights" are laid intermediate the ends of the coil, and at each end thereof the proper number of substantially vertical wrappings of the insulation material provided.

*The driving mechanism.*

Figure 3:
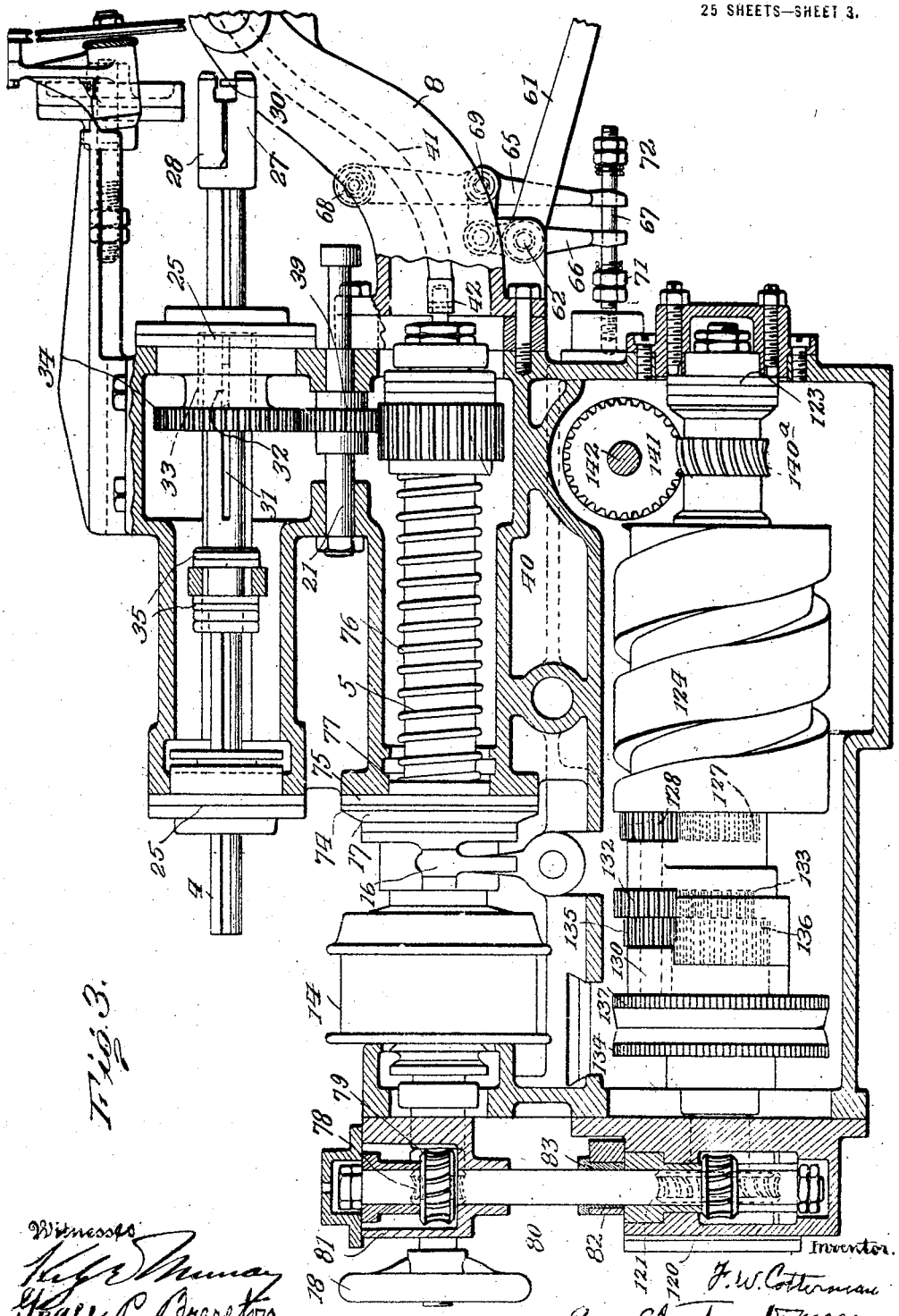
Fig. 3 is a longitudinal vertical sectional view through the machine.

Referring to Figs. 1, 2 and 3 of the drawings, the driving mechanism is rotated as hereinbefore mentioned through the pulley 14 and clutch 16 connection. The pulley 14 is loosely carried by the driving shaft 5 and is adapted to be engaged by the clutch 16 when the machine is operated. This clutch is held into engagement with the said pulley by a system of levers which are automatically disengaged through the closing of an electric circuit, as will be more fully hereinafter described in connection with the starting and stopping mechanism. The drive shaft 5 is provided on its outer end with a suitable hand or drag-wheel 18, the purpose of which is to permit of a sufficient retarding of the driving shaft when the clutch is thrown into engagement so as not to break the thread of the insulating material. This drag-wheel is of usual construction and further description thereof is not deemed necessary.

The brake mechanism 17 is associated with the clutch and, as the clutch is disengaged, the brake is applied. The brake consists of a suitable disk 74 carried by the clutch and adapted to engage another disk 75 secured to the end of the casing 2.

A worm-gear 78 is keyed to the drive-shaft 5 and meshes with another similar gear 79 carried by a vertically disposed shaft 80 at one end of the machine. The gears 78 and 79 are suitably mounted in a casing 81. Through this vertical shaft 80 motion is transmitted to the cam shaft mechanism to be presently described. The vertical shaft 80 is provided, intermediate its ends, with an eccentric mechanism for controlling the running, stopping and clutch mechanism. This eccentric mechanism comprises a laterally disposed arm 82 provided near one end with an eccentric 83 secured to the shaft 80, and at its other end with a pin 84 adapted to engage a movable pin 85 carried by a lever 86 of the stopping mechanism. During the operation of the machine, this laterally disposed arm 82 is given vibratory movement. When the stopping lever 86 carrying the pin 85 is moved into the path of this vibratory movement of the pin 84, the stopping mechanism of the machine is operated, throwing out the clutch and applying the brake by a mechanism now to be described and referred to as the "starting and stopping mechanism."

*Starting and stopping mechanism.*

Referring to Figs. 1, 17, 18 and 19, the mechanism for stopping the machine includes the lever 86 pivotally mounted, as at 87, on one side of the machine. The upper end of the lever 86 is provided with the pin 85 slidably mounted in a sleeve 88. The pin 85 is provided with a stud 89 projecting through a slot 90 in the sleeve 88, the purpose of which is to limit the movement of the pin 85 within said sleeve. A suitable spring 91 is interposed between the shoulder on the pin 85 and one end wall of the sleeve 88, whereby a resilient sliding movement of the pin 85 is obtained for returning it to normal position. Coöperating with the pin 85 is a lever 92 pivoted at 93 to the casing of the machine and provided on one arm 94 with a suitable projection 95 adapted to contact with the sliding pin 85. The opposite end 96 of the lever 92 has secured thereto a plate 97 provided at one end with a shoulder 98. The lever 92 is spring-pressed through the medium of spring 99 interposed between the outer end of the arm 96 of the lever and a suitable abutment 100 provided on the casing of the machine.

Lever 101 for operating the clutch is associated with the herein described lever 92. This lever is secured to the pivot shaft 107. A sleeve 101ª is also secured to this shaft 107 and is provided with upper forked ends 102 which engage the clutch member and move the clutch into and out of engagement. The lower end of the lever 101 is provided with an offset portion 103 between which, and a lug 104 provided on the casing, a spring 105 is interposed. The purpose of this spring is to normally retract the clutch from engagement and apply the brake. This lever 101 is provided with a lateral lug 106 which extends in the path of other lugs carried by the starting lever 12, now to be described. The starting lever 12 is pivoted at 107 on the same shaft that the lever 101 is pivoted. The starting lever 12 comprises a depending offset handle portion 108 and a substantially right-angularly disposed portion 109 adapted to engage pawls which operate the transmission mechanism.

The starting lever has provided just above the handle portion 108 a laterally disposed lug 110 which contacts with the lug 106 carried by the clutch lever 101. There is also provided, just above the handle portion on the starting lever 12, a laterally projecting plate 111, the lower end 112 of which contacts with the shoulder 98 of the plate 97 secured to the lever 92. A spring 113 is interposed between this plate 111 and a suitable abutment 114 provided on the casing of the machine.

The mechanism for controlling the several levers just described includes an electric circuit operated through contacts on the counting mechanism, adjustable contacts on the winding slide to be later described; and a magnet 115 arranged to energize a suitable armature 116 carried on the lower arm 117 of the hereinbefore described lever 86. A spring 86ª tends to normally hold the armature 116 out of contact with the magnet 115.

The operation of this mechanism is as follows: Assuming that the machine has been started, the clutch having been engaged by moving the starting lever 12 in the direction of the lower arrow shown in Fig. 17, the vibrating arm 82 carrying the pin 84, is operated. The electrical circuit of the machine being at this time deënergized, the lever 86 carrying the sliding pin 85 is held out of alinement with the vibrating pin by the spring 86ª. When the circuit is closed, after the proper number of layers have been counted off by the counting mechanism, the magnets 115 will be energized, the armature 116 retracted, the lever 86 rocked on its pivot, and the sliding pin 85 thereof will be brought into alinement with the vibrating pin 84. When the pin 84 strikes the sliding pin 85, the latter will be forced against the projecting pin 95 of the lever 92. This lever will then be rocked on its pivot 93 lowering the plate 97. When the plate 97 is lowered against the tension of the spring 99, the shoulder 98 thereof clears the lower end 112 of the plate 111 carried by the starting lever, whereupon the spring 113 forces the said starting lever in the direction of the arrow shown in dotted lines in Fig. 17. As the starting lever 108 is moved, lug 110 no longer restrains lug 106, thereby allowing spring 105 to move lever 101 to retract the clutch from out of engagement and apply the brake. The starting lever 12 when moving in the direction of the arrow, shown in dotted lines in Fig. 17, lifts the arm 109 thereof, the outer end of which engages the pawls which operate in conjunction with the reversible transmission mechanism, to be hereinafter described.

To reset the starting mechanism, the starting lever 12 is gripped by the handle portion 108 and moved in the direction of the arrow, shown in full lines in Fig. 17, when the plate 111 will be carried along the plate 97 until the lowermost end 112 drops over the shoulder 98 of the said plate 97 and the spring 99 operating upon the arm 97 of the lever 92 forces the said lever into its normal position and sets pin 95, carried by the arm 94 of the said lever, for engagement by the sliding pin 85 on the next operation of the machine.

*The cam shaft mechanism and reversible transmission.*

Referring to Figs. 10 to 14 inclusive, the cam shaft mechanism is driven through the worm gear 120 carried by the vertical shaft 80 and a similar gear 121 keyed to the cam shaft 122. The cam shaft is mounted in suitable bearings 123, at each end of the casing, and has associated therewith the following reversible transmission mechanism now to be described.

Revolubly mounted around the shaft 122 is the spirally grooved cam 124, in the groove of which operates a roller 201 (Fig.

4) carried by a slide 200 of the reversing mechanism to be later described. This roller is moved back and forth in a longitudinal path and serves to transmit the reciprocatory movement to the winding spindle. The spiral cam 124 is keyed to the shoulder 126 of the gear 127 loosely mounted on the shaft 122. Meshing with the gear 127 is a gear 128 keyed to a longitudinally disposed shaft 129 journaled in a casing or housing 130, keyed at 131 to the shaft 122. A reversing gear 132 is keyed to the shaft 129 and meshes with a gear 133 formed on the hub of a ratchet wheel 134. A gear 135 is also keyed to the shaft 129 and meshes with a gear 136 formed on the hub of a similar ratchet 137. These ratchets 134 and 137 have the same number of teeth, in the present instance fifty each, and are loosely mounted on the shaft 122 and each other.

Coöperating with these ratchet wheels 134 and 137 is a pawl 138 (Fig. 19) pivoted at 139 and provided at its opposite end with a nose 140 adapted to be engaged by the arm 109 of the starting lever 12, see Fig. 17. By this construction of reversible transmission, it will be seen that as one of the said ratchets is held, the spiral cam 124 will rotate in one direction, and when the other of said ratchet wheels is held, the spiral cam 124 will rotate in the opposite direction.

Assuming, therefore, that the ratchet 134 is held, the spiral cam will rotate top forward. This is accomplished by the casing 130 carrying the shaft 129 and the pinions 128, 132, 135, about the fixed or held gear 133. The rotation of this casing in turn transmits rotary motion to shaft 129, which in turn transmits a rotary motion through gears 128 and 127 to the spiral cam. When the pawl 137 is fixed or held, the reversing of the spiral cam takes place, that is, the casing 130 carrying the shaft 129 and the aforesaid gear wheels, will take motion from the gear 136 and transmit it through gears 128 and 127 to the spiral cam in an opposite direction.

While I have shown this form of reversible transmission, it will be understood that various other types can be substituted.

On one end of the shaft 122 is keyed a spiral gear 140ª which meshes with a similar gear 141 keyed to the laterally disposed shaft 142 projecting through the casing as at 143, and having secured to its outer end the crank arm 144 of the operating crank lever 20. By this construction it will be seen that the spiral cam can be rotated by hand in either direction when the machine is stopped and pawl 138 is lifted out of engagement with both ratchets 134 and 137, for reciprocating the winding spindle.

Counting mechanism.

Referring to Figs. 1 and 20 to 23 inclusive of the drawings, the counting mechanism 13 is adapted to indicate the required number of layers for the secondary winding and comprises a dial 150, secured to the casing of the machine. Coöperating with the dial 150 is a rotatable disk 151, provided with a suitable pointer marking 152. A lock nut 149 is provided for adjustably securing the rotatable disk 151 within the dial 150. This pointer marking, when set at the proper number on the aforesaid dial, indicates the number of layers which are to be wound. The disk 150 is recessed, as at 153, and is provided with a stop pin 154 against which a similar pin 155 carried by the rotating ratchet 156 abuts when the mechanism is reset.

The ratchet 156 is secured by screws 157 to the sleeve 158 mounted on the shaft 159. The sleeve 158 is recessed, as at 160, and receives a suitable spring 161 for keeping the parts in their proper tensioned relation when an adjustment is being made. A nut 162 is provided on the shaft 159 and abuts against the outer shoulder of the sleeve 158 as at 163. A washer 164 is interposed between the nut 162 and the spring 161.

On the outer end of the shaft 159 an operating hand-wheel 165 is keyed. Coöperating with the ratchet 156, in which there are as many teeth as there are graduations or markings on the dial 150, is a pawl 166 pivoted at 167 and provided with a nose 168 for engagement with the ratchet 156. A spring 169 secured to an arm of the pawl, and an adjustable stop, serve to keep the pawl normally in engagement with the said ratchet and limit its return movement respectively. This adjustable stop is indicated at 171, see Fig. 21.

The pawl is pivotally mounted on an arm 172 extending from a hub 173 secured to a sleeve 174 mounted on the shaft 159. This sleeve is mounted in suitable bearings 175 of the frame of the machine. On the outer end of the sleeve 174 a lever 176 is clamped. This lever carries a roller 177 which operates upon cam surfaces of the reversing mechanism to be described later, for operating the pawl and ratchet counting mechanism. A worm-gear 180 is keyed to the countershaft 159, and meshes with a similar gear 181 keyed to the pyramiding mechanism, to be described hereinafter. The ratchet 157, and more especially the flange of the sleeve 158, is provided with a pin 183, the purpose of which is to actuate an electrical contact mechanism now to be described.

This mechanism comprises a lever 184 between the lower end of which and an abutment 185, a spring 186 is interposed. A block 187 is provided on the lever 184 and has secured thereto spring-arms 188 and 189. In operation the arm 188 is engaged by the pin 183, and as the lever is rocked against the tension of the spring 186, the arm 189 is moved into contact with a stud 190, closing an electrical circuit in conjunction with certain adjustable contacts on the winding slide, hereinafter to be described.

A suitable brake 195 of the adjustable strap type is provided on an enlarged portion 196 of the shaft 159, and serves to regulate the tension on said shaft through the adjusting screws 197 and 198, for preventing any tendency of the ratchet to overthrow.

To operate the counting mechanism in setting same for a predetermined number of layers, the following manipulations are made. Referring to Figs. 21 and 22, and assuming that forty-two (42) layers are to be applied on the coil as the secondary winding, the lock nut 149 is loosened and the rotatable disk 151 provided with the pointer marking 152, moved to the graduation marked 84 on the dial 150. The graduation 84 is selected, because twice 42 (the number of layers desired) equals 84, and as the lever which oscillites the counting mechanism is operated by a cam on the reversing mechanism (to be described) at each end of the stroke, and the ratchet wheel 156 is provided with the same number of teeth as there are graduations on the dial 150, it will be seen that 84 of these operations by the pawl on the ratchet will bring the mechanism to the 84th graduation selected, and the machine will be stopped.

After the disk 151 has been set, the locking screw 149 is fastened. The next operation is to adjust the width of the first layer to be applied to the coil, and as this is done through portions of the counting mechanism, it will now be briefly referred to. Unloosen the locking nut 162 on the shaft 159, and turn the said shaft independently of the counting mechanism by gripping the hand-wheel 165 keyed to the said shaft 159. As the shaft 159 is rotated, the worm gear 180 keyed thereto is revolved, and as this gear meshes with a similar gear 181 keyed to a shaft of the pyramiding mechanism to be presently described, the relative length of the first layer can be determined by the position of the right and left screws adapted to be set for co-action with stop pins, at the end of each layer, to be described in detail hereinafter.

After the desired length has been obtained, and a test made thereof by the hand-operating mechanism including the hand crank lever mechanisms 20 and 144, operable independently of the motor-operating mechanism, the locking nut 162 is screwed against the shoulder 163 of the sleeve 158 so as to connect the ratchet 156 to the shaft 159 and cause both to be rotated together.

Assuming now that the machine is running, it will be seen that as the lever 176 is rocked by the roller 177 operating upon the cam surfaces 228 and 229, as shown in Fig. 16, of the reversing mechanism, the sleeve 174 to which the said lever 176 is clamped will be oscillated, at the end of each layer, and as the arm 172 on which the pawl 166 is pivoted, is rocked, the said pawl will engage the teeth of the ratchet 156 and rotate the same in counting the layers.

The ratchet being now rotated, it will be apparent that the pin 183 carried by the sleeve 158, to which the ratchet is secured, will be moved in the direction of the arrow shown in Fig. 21 of the drawings, toward the spring arm 188 connected to and adapted to operate, the contacts 189 and 190 in closing the electrical circuit of the machine and causing the said contacts in conjunction with the contacts of the winding slide to be presently described, and operated immediately thereafter when the last portion of the last layer has been laid on the coil, to effect the stopping of the machine.

To reset the counting mechanism, the pawl 166 is lifted by the hand through the agency of the arm 191 carried thereby, and the ratchet 156 is turned back until the pin 155 carried by the sleeve 158 abuts against the stop pin 154 secured to the disk 151. The resetting of the counting mechanism is performed manually, and the pyramiding mechanism is reset by the act of resetting the counting mechanism. Thus it will be seen that a rapid resetting of the machine for winding coils of the same number of layers, can be obtained in a minimum amount of time.

*Reversing mechanism.*

Referring to Figs. 4 and 5 and 10 to 16 inclusive, the reversing mechanism is adapted to actuate the pawl 138 with respect to the ratchet wheels 134 and 137 of the reversing transmission mechanism, thereby reversing the spiral cam 124, as hereinbefore described.

This reversing mechanism is on the opposite side of the machine and comprises a slide 200 to which is secured a roller 201. The slide is mounted in guides 202 secured to the casing of the machine. The slide is provided with a roller stud 203 adapted to fit into an elongated recess of an offset lever 204 pivoted at 205 to the casing of the machine. While this lever is interconnected with a slide of the reversing mechanism, it is adapted to transmit the reciprocatory motion to the winding spindle through a winding slide mechanism to be hereinafter described. Mounted above the slide 200 is another slide 206.

The slide 206 mounted above the slide 200 is guided by the upper surface of one set of the guides 202 and spaced guides 207 secured to the machine. The slide 206 has extending inwardly through the casing of the machine, laterally projecting arms 208, in which is movably mounted a rod 209, see Fig. 10.

The rod 209 is provided intermediate the lateral arms 208 with spaced blocks 210 pinned thereto. Actuating springs 211 are interposed between the blocks 210 and the arms 208 respectively. The pawl 138 which alternately engages ratchet wheels 134 and 137 of the reversible transmission mechanism is secured to the rod 209 and when the rod is shifted longitudinally by mechanism in opposite directions, the reversing of the cam shaft and other interconnected parts is effected.

The rod 209 is further provided with yielding springs 212 interposed between two series of nuts 213 and the end walls of the machine casing, respectively. The purpose of the springs 211 is to force the rod in opposite directions alternately in conjunction with a holding or latch mechanism now to be described.

The slide 206 is provided intermediate its ends with spring-pressed latches 214 and 215 pivoted at 216 and 217 respectively. A spring 218 is interposed between projecting arms 219 of the said latch, and tends to normally force the outer ends thereof toward the rod 209 into the path of the blocks 210. The latches are each provided with engaging shoulders 220 and 221, adapted to engage the inner end walls 222 of the blocks 210, alternately. Inclined surfaces 223 and 224 are each provided on the said latches, and coöperate with rollers 225 and 226 respectively carried by slide 206.

A cam 227 is also carried by the slide 206, the opposite inclined walls 228 and 229 of which operate alternately upon the roller 177 mounted on the arm 176 secured to the sleeve 174 of the counting mechanism hereinbefore described.

This reversing mechanism is operated through the slide 200 as it is moved by the roller 201 carried thereby in the path of the spiral groove of the spiral cam 124.

Referring to Figs. 15 and 16 of the drawings, the slide 200 is provided at each end with studs 230 adapted to engage the heads of right and left threaded screws 231 and 232 of the pyramiding mechanism to be presently described. These screws are threaded in sleeves 233 and 234, which are secured by brackets 235 and 236 to the slide 206 by screws 237. As the winding finger 7 laying the insulation, nears each end of the coil, the reversing mechanism is brought into operation.

Assuming that the slide 200 is traveling in the direction of the arrow thereon indicated in Fig. 15, the stud 230 will engage the head of the screw 231, and in so doing pick up the slide 206 to which the bracket 235 is secured.

Referring to Fig. 10, it will be seen that as the slide 206 is moved in the same direction as the slide 200, the mechanism, and more especially the roller 225 carried by the slide 206 will engage the inclined surface 223 of the latch 214, and in so doing disengages the shoulder 220 thereof from the end wall 222 of one of the blocks 210. As soon as the latch 214 is disengaged from this block 210, the spring 211 at the left of the machine, as shown in Fig. 10, which is now compressed, will actuate the rod 209 and quickly move it in the direction of the arrow indicated on said rod in Fig. 10.

The opposite latch 215 now engages the opposite block 210, the shoulder 221 of said latch abutting the end wall 222 of the other said block 210. The spring 218 assures the ready engagement of the latches with the blocks 210. When the rod 209 is moved, it will be seen that the pawl 138 carried thereby is also shifted from engagement with the ratchet 137 to the ratchet 134 for reversing the transmission mechanism associated with the spiral cam shaft. During this movement of the slide 206, it will also be noted that the cam surface 228 of the cam 227 has engaged the roller 177 of the arm 176 and operated the pawl of the counting mechanism, in registering the application of one layer of the second winding, as has been hereinbefore described.

When the reversing mechanism has been operated, the slide 200 is reversed in its path of travel, as indicated by the arrow shown in dotted lines in Fig. 15, whereupon a similar operation to that above described takes place when the stud 230 engages the head of the screw 232 and shifts the slide 206 with its associated roller 226 into the path of the inclined surface 224 of the latch 215, disengaging shoulder 221 thereof, and allowing the spring 211 at the right hand side of the machine, to quickly move the rod 209 and the pawl 138 secured thereto, back into engagement with the ratchet 137. During this reverse operation, the cam surface 229 of the cam 227 operates the roller 177 on the end of the arm 176 and causes the pawl to count another layer upon the registering dial, also to shorten through the worm gear 180 on the end of shaft 159 the length of said layer.

The operation is repeated until the requisite number of layers have been applied to the coil, when the contacts of the counting mechanism are operated, the circuit closed and the machine stopped, as hereinbefore described. During the movement of the slide 206, the rod 67 adjustably secured thereto, is correspondingly moved, and the tilting movement transmitted to the winding finger at each end of the coil effected by the system of levers hereinbefore described in connection with the winding mechanism illustrated in Figs. 24, 25 and 26. During the application of the layers, the pyramiding thereof takes place, and will now be described.

*Pyramiding mechanism.*

Referring to Figs. 5, 10, 15 and 16, the pyramiding mechanism is operated through the rotation of the counting mechanism shaft 159 having secured to one end thereof the worm gear 180, adapted to mesh with a smaller similar gear 181 (hereinafter described), keyed to a shaft 242 mounted in bearings 243 extending from the guide 202 of the machine, (see Fig. 15). The shaft 242 has keyed thereto in longitudinally disposed keyways 244, see Fig. 16, the right and left threaded screws 231 and 232, mounted in the sleeves 233 and 234, hereinbefore described.

From this construction, it will be seen that as the counting mechanism is operated, the worm gear 180 keyed to the shaft 159 thereof, will be rotated through a step-by-step motion, and the smaller gear 181 with which it meshes given a corresponding motion. As the smaller gear 181 is gradually rotated, the shaft 242 to which it is secured will impart a rotating motion to the right and left screws 231 and 232, so that the heads thereof will be gradually fed outwardly and engage the studs 230 on the slide 200 earlier in its travel and at correspondingly more frequent intervals, in effecting the reversing of the mechanism.

The length of the longest layer applied to the coil is controlled by the relative position of these right and left screws 231 and 232, when the machine is first started, and as has been hereinbefore described in connection with the counting mechanism, and as the machine continues to operate, the above gradual reduction or pyramiding of the succeeding layers occurs as has been described.

*Winding slide mechanism.*

Referring to Figs. 4, 15 and 28 to 31 inclusive, of the drawings, the winding slide mechanism is arranged to transmit the reciprocating movement to the winding spindle 4.

This mechanism comprises a slide 250 mounted in guides 251 secured to the casing of the machine. It is this slide 250 which carries the arm 36 interposed between the collars 35 of the spindle 4, as hereinbefore described. Adjustably secured to the slide 250 by screws 252 is a vertically slotted bracket 253, in which is adjustably mounted a block 254. This block carries a stud and roller 255 which operates in an elongated recess 256 formed in the upper end of the upper arm 257 of the lever 204 pivoted at 205 as hereinbefore described. By this construction, it will be seen that as the lever 204 is rocked on the pivot 205 through its connection with the slide 200 (hereinbefore described), the upper end 257 thereof will operate upon the stud and roller 255 carried by the block 254, and through the bracket connection 252 reciprocate the winding slide 250, and in turn the winding spindle 4.

The distance of reciprocation of the winding spindle and the relative spacing of the wire wrappings applied to the coil, as desired, can be adjusted by the following mechanism. The block 254 is vertically adjustable in the bracket 253 by means of the rod 258 secured thereto, and provided with a suitable handle grip 259 extending above the said bracket. A set screw 259$^a$ positioned on one side of the bracket 253 at the top thereof, holds the rod 258 in its adjusted position. Suitable graduations may be provided for determining the position of the block 254 for different gage wire. These graduations may be on the rod 258, or otherwise relatively associated with the winding slide mechanism.

From this construction it will be seen that as the block 254 is shifted to different positions in the bracket 253, a corresponding change of the stud and roller connections 255 will be obtained with the arm 257 of the lever 204, thereby varying the throw thereof as transmitted from the lower slide 200, for different lengths of reciprocatory movement of the winding spindle 4. The wire, therefore, can be laid in wrappings on the coil in close contacting relation, or it may be spaced. It will also be obvious that a different gage wire will require a varying adjustment, should it be wound in contacting relation about the coil.

*Adjustable contacts for regulating the finishing layer or portions thereof.*

A contacting device is coöperatively connected with the winding slide mechanism and will now be described. The said device is adapted to be adjusted with respect to the last layer of the coil or any portion thereof. If the counting mechanism has been set for say forty-two layers, and one third of a layer more, the said contacting device will not operate until the said one-third of the layer has been completed, though the counting mechanism contacts operated when the forty-second layer was complete, as has been described hereinbefore.

Referring to Figs. 15 and 28 to 30 inclusive, the device comprises an adjustable slide 260 mounted in a guideway 261. The slide is provided with a spring contact arm 262 formed with a contact point 263. A mating contact point 264 is also provided on the slide.

Coöperating with the spring contact arm 262 and more especially a pin 265 carried on the under side thereof, is a roller 266 mounted on the upper end of the bracket 253 of the winding slide mechanism.

In adjusting the contact device, it is set with relation to the throw of the lever 204, and in turn the roller 266, whereby the spring contact arm 262 can be operated and the circuit closed when the last portion of the last layer of the coil is applied.

This contact is operated on each reciprocation of the slide 250, but because the counting mechanism contacts are not operated until the last layer is applied, and the said contacts are connected in the electrical circuit of the machine, they will not become effective in closing the circuit until after the counting mechanism contacts have been operated, as will be more fully hereinafter described in connection with the electrical system of the several mechanisms.

Diagram of electrically connected mechanisms.

Referring to Fig. 34 of the drawings, the several mechanisms of the machine are diagrammatically shown in an electrically connected circuit. As has been hereinbefore described, certain of the mechanisms of the machine control an electrical circuit which operates to stop the machine when the required number of layers and any portion of the last layer, have been wound on the coils, or to stop the machine should the wire break, or to stop the machine should the insulation break, and to indicate such stoppage by an illuminated colored incandescent light, so that the operator in charge of the machine will be acquainted therewith, and ascertain the cause.

The following elements of the machine are shown diagrammatically in this figure, and are (the coil being wound by the winding finger with the insulation), the wire-feeding device, the insulation feeding device, the counting mechanism for determining the number of layers, the adjustable contacts coöperatively connected with the winding slide for regulating the laying of any portion of the last layer on the coil, the magnet for operating the lever of the stopping and starting mechanism, the signal lights for indicating the condition of the machine, and certain auxiliary contacts operated by the starting lever for maintaining a closed circuit independent of the magnet coils, after the machine has stopped.

The secondary winding of the coil which is being wound is illustrated at 300, and the winding finger laying the insulation at 301. The guide pulleys for directing the wire onto the coil are designated by the numeral 302.

The wire feeding device 9 comprises a pulley 303 mounted on the end of a lever 304 pivoted at 305 on a suitable support 306. The wire c passes over the pulley 303 from a suitably supported wire-containing spool 307. The lever 304 has secured near its opposite end, one end of a rod 308, the other end of which is connected to a bracket 309 pivoted at 310. The forward end of the bracket 309 is adapted to strike a contact 311 when the wire breaks, and close a circuit through the co-acting contact 312, as will be readily understood. When the wire is feeding, the lever 304 is held in a balanced position by the weight 313, but should the wire break it will pull the end of the lever to which the rod 308 is connected, downwardly and cause the pivoted bracket 309 to close the contacts 311 and 312.

The insulation feeding device comprises a bracket 314 which may be secured to any portion of the machine, and a support 315, on which is supported the reel or bobbin of cotton thread insulation $i$. This thread $i$ is wound in the usual manner for facilitating its ready removal from the bobbin without breaking. The thread $i$ passes upwardly from the bobbin through the usual corrugated tensioning jaws 316 and 317, pivoted at 318 in the bracket 314. It continues through a thread guide 319 and the upper looped end 320 of the contact 321 on to the winding finger, as shown.

The contact 321 is pivoted at 322 and is held out of engagement with the contact 323 by the insulating thread $i$ as it passes through the upper looped end 320 of the contact 321 under the desired tension. Should the insulation thread $i$ break, the contact 321 will drop on the contact 323 and close the circuit, thereby stopping the machine, as will be presently described.

The counter mechanism hereinbefore described is designated by the circle 324 as rotating in the direction of the arrow shown. It is provided with the pin 183 adapted to move the spring arm 188 carried by the pivoted lever 184, and in so doing close the contacts, one of which is carried on the spring arm 189, and the other of which is the stud 190, as hereinbefore described.

The adjustable contacts are operated by the winding slide mechanism hereinbefore described, and are adjusted with respect to the desired portion of the last layer as the point at which the machine is to stop. This mechanism has been described as comprising the adjustable slide 260 provided with the contact points 263 and 264. These contacts are operated by a movable roller 266 carried by the winding slide mechanism which acts to close the said contacts on each reciprocation of the winding slide. Inasmuch as these contacts 263 and 264 are in circuit with the counting mechanism contacts, they will not become effective in closing the circuit until after the counting mechanism contacts have been brought together and the predetermined portion of the last layer of the coil wound thereon.

The magnet 115 for operating the armature 116 carried by the lower arm 117 of the lever 86 in stopping the machine has been heretofore described; also the starting lever 12.

The auxiliary contacts 325 and 326, herein provided, are closed by the starting lever 12 when the machine is stopped and the said lever thrown in the direction of the arrow indicated in the diagram. The purpose of these contacts is to insure a flow of current through a circuit of the machine other than through the magnets 115 after the other mechanisms of the machine have been operated.

The indicating signal lights 19 hereinbefore mentioned, comprise a red electric bulb 327 and a green electric bulb 328, the latter of which is preferably connected in the circuit for continuous illumination and the former of which is only illuminated when the machine is stopped. This contrast of colors is desirable where an operator is assigned to the manipulation of a series of these winding machines, so that he can discern from a distance the condition of any machine in his group.

The motor or other source of electrical power for the mechanisms of the machine, is indicated at 329, having one conductor 330 extending and connected to the magnet 115, and the other conductor 331 connected and extending to the contact spring arm 189 of the counting mechanism. With these principal conductors 330 and 331, the other series of contacts and the controlling magnet for stopping the machine are connected in circuit, as shown.

With regard to the wire $c$ contacts, the conductor 332 connected to the contact point 311, is connected to the opposite side of the magnet 115, as shown. The conductor 333 connected to the contact point 312, is connected to the principal conductor 331 at 334.

With regard to the insulation $i$ contacts, the conductor 335 connected to the contact point 321, is further connected to the principal conductor 331 at 336. The conductor 337 connected to the contact point 323 is further connected at 338 to the conductor 332 which connects with the magnet 115.

With regard to the counting mechanism contacts, the conductor 339 connected to the contact stud 190 of the counting mechanism is further connected to the contact 264 of the adjustable contacts operated by the winding slide. The principal conductor 331 is connected to the contact arm 189.

With regard to the adjustable contacts, the other of said contacts 263 has connected to it a conductor 340 which connects at 341 with the conductor leading into the conductor 332, which in turn is connected to the magnet 115.

The signal lights 19 are connected as shown, the red in series with the circuit, and the green in multiple, by means of the conductor 342.

The operation of the above electrically connected mechanism is as follows:

The counting mechanism is set for the required number of layers to be applied to the coil, and the adjustable contacts operated by the winding slide set for example, at one-third portion of the last layer. The starting lever 12 is held in position during the operation of the machine, out of contact with the point 326.

Now when the counting mechanism indicated at 324 has stepped off the proper number of notches on the ratchet the pin 183 carried thereby will have been moved in the direction of the arrow, and the spring arm of the lever 186 engaged thereby. The lever 184 is then rocked and the spring arm 189 is brought into contact with the contact stud 190, closing this portion of the circuit. The circuit, however, is not completed until the adjustable contacts 263 and 264 are brought together. On the one-third portion of the last layer applied to the coil, these contacts operate to close and complete the circuit, whereupon the magnet 115 is energized, the armature 116 attracted and the machine stopped, as hereinbefore described in connection with Figs. 17, 18 and 19.

This circuit when completed is traced through the principal conductor 331 to the contact arm 189 of the counting mechanism, then through the conductor 339 to the contact 264 of the adjustable contacts, then through the conductor 340 to the connection 341 where it continues through the conductor 337 to the connection 338 to the conductor 332 into the magnet 115, through said magnet and back through the principal conductor 330 to the source of electrical power.

Should the wire break, the circuit is closed and completed as follows:

Current passes through the principal conductor 331 to the connecting point 334; then through the conductor 333 to the contact 312 of the wire feeding device; thence through the contact 311 to the conductor 332 leading to the magnet 115; then through the said magnet and back through the principal conductor 330 to the source of electrical power.

Should the insulating thread $i$ break, the circuit is closed and completed as follows:

Current passes through the principal conductor 331 to the connecting point 336, and then through the conductor 335 to the pivoted contact 321 of the insulation feeding device on through contact 323 and the conductor 337 to the connection point 338, and then into the conductor 332 leading to the magnet 115; then through said magnet back through the principal conductor 330 to the source of electrical power.

When any of the above circuits have been closed and completed, the red light 327 being arranged in the conductor 331 will be illuminated and the operator notified that the machine has stopped.

The circuit through the auxiliary contacts 325 and 326 is closed by the movement of the starting lever 12 in the direction of the arrow when the armature 116 is attracted by the energized magnet 115 in the circuits hereinbefore described. The contacts 325 and 326 are brought together and the current passes through the circuit as follows:

Through the principal conductor 331 into the conductor 326$^a$ to the contact 326, and on through the contact 325 and the conductor 325$^a$ to the conductor 330 back to the source of electrical power. These contacts act to keep the current flowing continuously through the indicating red light, after the machine has been stopped, without having it pass through the magnets.

Wire-feeding pulleys.

The guide rollers indicated generally by the numeral 302 for directing the wire $c$ to the coil, are shown in Figs. 32 and 33, and comprise the large grooved pulley 10, angularly disposed with relation to the coil for permitting the winding finger to clear the pulley 10 when its axis becomes parallel to the winding spindle, and a superimposed smaller grooved pulley, adapted to rotate on a horizontally disposed axis and closely spaced from the said larger pulley 10.

The large pulley 10 has a suitable bearing 351 in the sleeve portion 352 of the bracket 353, and the smaller pulley 350 has a bearing in the upper end of the vertically extending arm 354 of the sleeve 352.

The bracket 353 is provided with a face 355 adapted to bear against a similar face 356 formed on the end of an overhanging adjustable bracket 357 mounted on the top of the casing 2 of the machine (see Fig. 1). A bolt 358 and spring 359 operate to hold these two faces 355 and 356 against each other in tensioned relation. Nuts 360 are provided on one end of the bolt 358 and permit of varied tensioning of the spring 359.

From this construction, it will be seen that the guide pulleys can be relatively adjusted, and if positioned to rest on and apply the wire to the coil at the start of the winding, the increasing of the layers will gradually move the pulleys with their brackets on the bolt 258 as a pivot against the tension of the spring-pressed faces 255 and 256.

The wire-feeding mechanism indicated by the numeral 9 in Figs. 1 and 34, may be of any well known construction and the only illustration thereof is that conventionally shown in Fig. 34 of the drawings.

Operation of the machine.

Assuming that it is desired to wind forty-two (42) layers on the coil positioned in the chuck 26 on the winding spindle 4 as the secondary winding, the lock screw 149 is loosened and the rotatable disk 151 carrying the marking pointer 152 is turned to graduation number 84 on the dial 150, of the counting mechanism. The lock screw 149 is then fastened.

The next step is to adjust the width of the first layer on the coil. This is accomplished by unlocking the nut 162 on the shaft 159 and turning the hand wheel 165 thereby rotating the shaft 159 and the worm gear 180 keyed to the opposite end thereof. The worm gear 180 meshes with a similar smaller gear 181 keyed to the shaft 242 and as this latter shaft is rotated, the screws 231 and 232 will be fed inwardly or outwardly as the case may be, and the relative position of the abutting heads carried by the said screws located for regulating the distance of travel of the slide 200 and the pins 230 carried thereby, described in connection with the reversing mechanism for reciprocating the spindle.

The length of the layer is tested by reciprocating the winding spindle 4 carrying the coil, through the head or crank lever mechanism 20 and 144, which is designed to rotate the gear 141 and in turn the gear 140$^a$ keyed to the cam shaft 122 for revolving the spiral cam 124 which in turn rocks the lever 204, to the upper end of which latter the winding spindle 4 and associated winding slide mechanism is connected, as has been heretofore described.

When the desired length of layer has been obtained between the ends $e$ of the coil, and sufficiently tested, the locking nut 162 is fastened against the shoulder 163 of the sleeve 158 and the counting mechanism is ready to operate in the manner hereinbefore described. During the operation of the machine, it will be seen that as the counting mechanism is operated the pyramiding mechanism for successively shortening the length of the layers is also operated by the step-by-step rotation of the shaft 159, which in turn gradually moves the worm gear 180 adapted to mesh with the gear 181 of the pyramiding mechanism. The distance of travel between the heads of the screws 231 and 232 and the pins 230 on the slide 200 will be gradually lessened, and as a consequence the reversing of the winding spindle 4 in its reciprocating movement obtained at more frequent intervals.

The wire $c$ and insulation $i$ is now threaded, the end of the wire $c$ being connected to the end of the primary coil in the usual manner, and the insulation suitably fastened to the coil; and the winding finger 7 and more especially the spring finger thereof, laid upon the coil in close proximity to the wire-feeding pulley 10. The machine is now ready to start. Before starting the machine the rod 21 may be pushed inwardly to disconnect the winding spindle from the driving mechanism, so that several turns may be put on by rotating the spindle by hand.

The starting lever 12 of the starting and stopping mechanism is now gripped by the operator and moved in the direction of the arrow shown in Fig. 1 of the drawings. When this lever is moved, the brake is released and the clutch thrown in, by a gradual releasing of the drag wheel 18 in the usual manner. The shoulder 112 is now caused to bear against the end or shoulder 98 (see Fig. 17) and hold the lever in running position until the forty-two layers and any portion of the last layer, are completed.

When the starting lever 12 is operated, it will also be noted that the end 109 thereof is lowered, thereby allowing the pawl 138 to drop into engagement with either of the toothed wheels 134 or 137 of the reversible transmission for operating same as has been hereinbefore described. The eccentrically reciprocated pin 84 is now operating and will continue to do so until the electrical circuit is closed and the lever 86 swung, so that the yielding pin 85 carried thereby interrupts the movement of the pin 84 and causes the lever 92 to operate in releasing the shoulder 98 from the shoulder 112 in stopping the machine, see Fig. 17.

After completion, the coil is removed from the chuck 26 on the winding spindle 4 and another one positioned therein. The counting mechanism is reset as has been hereinbefore described, and the winding spindle moved back in place by turning the hand crank lever 144. The wire and insulation are again applied to the coil, the rod 21 operated to engage the gear 39, and the starting lever operated. Another coil is now being wound.

From the foregoing, it will be obvious that an efficient winding machine has been produced in which a simultaneous application of wrappings can be wound in a minimum amount of time.

Having thus described my invention, what I claim as new and desire to secure by Letters Patent, is:—

1. In a winding machine, the combination with a rotating winding spindle, of a winding finger angularly disposed with relation to the rotating spindle, means for rotating said winding finger in the opposite direction to that of the rotating spindle, and means for reciprocating the said winding spindle and means for changing the position of said winding finger at each end of the reciprocating movement of the winding spindle.

2. In a winding machine, the combination with a reciprocating rotatable winding spindle, of a winding finger angularly disposed with relation to the rotatable spindle, means for tilting said winding finger from its angular position to a substantially vertical position at each end of the reciprocating movement of the winding spindle, and means for rotating said winding finger in the opposite direction to that of the winding spindle.

3. In a winding machine, the combination with a rotatable winding spindle, of an angularly disposed winding finger arranged in yielding contact with the said winding spindle, means for rotating said winding finger in the opposite direction of rotation to that of the winding spindle, and means for reciprocating said winding spindle and means for changing the position of said winding finger at each end of the reciprocating movement of the winding spindle.

4. In a winding machine, the combination with a reciprocating rotatable winding spindle, of a material winding finger angularly disposed with relation to the winding spindle, means for guiding another winding material to the winding spindle, and means for rotating said winding finger in the opposite direction to that of the winding spindle and means for changing the position of said winding finger at each end of the reciprocating movement of the winding spindle.

5. In a winding machine, the combination with a reciprocating rotatable winding spindle, of a material winding finger angularly disposed with relation to the winding spindle, means for guiding another winding material to the winding spindle located in close proximity to the winding finger, and means for rotating said winding finger in the opposite direction to that of the winding spindle.

6. In a winding machine, the combination with a reciprocating rotatable winding spindle, of a material winding finger angularly disposed with relation to the winding spindle, means for tilting said winding finger into substantially a vertical plane at the end of each reciprocation of the winding spindle, means for guiding another winding material to the winding spindle, and means for rotating said winding finger in the opposite direction to that of the winding spindle.

7. In a winding machine, the combination with a reciprocating rotatable winding spindle, of a material winding finger angularly disposed with relation to the said spindle, means for guiding another material to the winding spindle yieldably positioned in contact therewith, and means for rotating said winding finger in the opposite direction to that of the winding spindle.

8. In a winding machine, the combination with a reciprocating rotatable winding spindle, of a material winding finger yieldingly and angularly disposed with relation to the said spindle, means for tilting said winding finger at the end of each reciprocation of the winding spindle, means for guiding another winding material to the winding spindle and arranged in yieldable contact therewith, and means for rotating said winding finger in the opposite direction to that of the winding spindle.

9. In a winding machine, the combination with a rotatable winding spindle, of a material-winding means angularly disposed with relation to the said spindle, means for successively shortening the length of the progressively laid layers of material, and means for reciprocating the said winding spindle, and means for tilting the winding means at each end of the reciprocation of the winding spindle.

10. In a winding machine, the combination with a reciprocating rotatable winding spindle, of a material-winding means angularly disposed with relation to the said spindle, means for successively shortening the length of the progressively laid layers of material, and means for rotating the said winding means in an opposite direction to that of the winding spindle, and means for tilting the winding means at each end of the reciprocation of the winding spindle.

11. In a winding machine, the combination with a reciprocating rotatable winding spindle, of a material-winding means angularly disposed with relation to the winding spindle, means for guiding another material to the winding spindle, means for rotating the said winding means in an opposite direction to that of the winding spindle, means for successively shortening the length of the layers of the materials progressively wound, and means for tilting the winding means at each end of the reciprocation of the winding spindle.

12. In a winding machine, the combination with a reciprocating rotatable winding spindle, of a material-winding means angularly disposed with relation to the winding spindle and arranged to yieldingly contact therewith, means for guiding another material to the winding spindle arranged in yielding contact therewith, means for rotating the said winding means in an opposite direction to that of the winding spindle, means for successively reducing the length of the layers of the materials progressively wound, and means for tilting the winding means at each end of the reciprocation of the winding spindle.

13. In a winding machine, the combination with a rotating winding spindle for receiving the product around which the layers are wound, of a material-winding device, means arranged in close proximity to the said material-winding device for guiding another material between the layers of material of the winding device simultaneously therewith, and means for reciprocating the winding spindle.

14. In a winding machine, the combination with a reciprocating rotatable winding spindle for receiving the product around which the layers are wound, of a material-winding device angularly disposed with relation to the winding spindle for applying the said material in band-like formation, and means for guiding another material in interposed relation within the boundary of the edges of the band-like formation.

15. In a winding machine, the combination with a reciprocating rotatable winding spindle for receiving the product around which the layers of materials are wound, of a material-winding device angularly disposed with relation to the winding spindle for applying the said material in continuous series of figure eights around the product, and means for guiding another material in continuous interposed relation within the series of figure eights.

16. In a winding machine, the combination with a reciprocating rotatable winding spindle for receiving the product around which the layers of material are wound, of a material-winding device angularly disposed with relation to the winding spindle for applying the said material spirally around the said product in series of figure eights of band-like formation, and means for guiding another material in spiral interposed relation between the bounding edges of the band-like formation of figure eights.

17. In a winding machine, the combination with a reciprocating rotatable winding spindle for receiving the product around which a plurality of layers of materials are wound, of a material-winding device angularly disposed with relation to the winding spindle for applying the said material around the said product in band-like formation with a plurality of crossings formed therebetween, and means for guiding another material onto the plurality of crossings formed by the first mentioned material in spaced relation from the second mentioned material.

18. In a winding machine the combination with a rotating winding spindle for receiving the product around which the layers are wound, of a plurality of devices for winding a plurality of materials simultaneously around the product in superimposed relation, one of said devices being angularly disposed with relation to the winding spindle, means for reciprocating the winding spindle, and means for changing the position of one of said winding devices at each end of the reciprocating movement of the winding spindle.

19. In a winding machine, the combination with a reciprocating rotating winding spindle for receiving the product around which a plurality of different qualities of materials are wound in superimposed relation, of a material winding device angularly disposed with relation to the winding spindle, means for changing the position of said winding device at each end of the reciprocating movement of the winding spindle, and means for applying different material in alternate relation to the first material.

20. In a winding machine the combination with a reciprocating rotatable winding spindle for receiving the product around which a plurality of layers of materials of varying qualities are wound in superimposed relation, of a material winding device angularly disposed with relation to the winding spindle, means for changing the position of said winding device at each end of the reciprocating movement of the winding spindle, and means for simultaneously and continuously applying a varying material in alternate superimposed relation with the first material.

21. In a winding machine, the combination with a winding spindle, a plurality of winding devices coöperatively associated with the said winding spindle, means for reciprocating the said winding spindle including a reversible transmission device, a spiral cam reversely operated by said reversible transmission device, a roller movable in said cam, a lever pivoted intermediate its ends having connected to one end the winding spindle and carrying on its other end the said roller, and means for operating the said reversible transmission device.

22. In a winding machine, the combination with a winding spindle, of a plurality of winding devices coöperatively associated with the said winding spindle, means for reciprocating the said winding spindle including a reversible transmission device, a double acting detent adapted to alternately engage the said reversible transmission device, means for alternately operating said detent including a reciprocating bar, and means for operating said bar.

23. In a winding machine, the combination with a winding spindle, of a plurality of winding devices coöperatively associated with the said winding spindle, means for reciprocating the said winding spindle including a reversible transmission device, a double acting detent adapted to alternately engage the said reversible transmission device, means for alternately operating said detent including a reciprocating bar secured thereto, and means for operating said bar comprising latch-controlled springs.

24. In a winding machine, the combination with a winding spindle, of a plurality of winding devices coöperatively associated with the said winding spindle, means for reciprocating the said winding spindle including a reversible transmission device, a double acting detent adapted to alternately engage the said reversible transmission device, means for operating said detent including a spring-reciprocated bar secured to said detent, and means for releasing said bar including a slide-controlled latch device.

25. In a winding machine, the combination with a winding spindle, of winding devices associated with said winding spindle, means for reciprocating the said winding spindle including a reversible transmission device, means for counting the number of layers laid by the winding devices including a graduated dial, a ratchet wheel relatively movable with respect to said dial, a pawl for rotating said ratchet wheel, a lever for operating said pawl, and means for operating said lever including a cam adapted to be operated by the reversible transmission device.

26. In a winding machine, the combination with a winding spindle, of winding devices associated with said winding spindle, means for reciprocating the said winding spindle including a reversible transmission device, means for counting the number of layers laid by the winding devices including a graduated dial, a disk relatively adjustable with respect to said dial, a ratchet wheel relatively movable with respect to the said dial and said disk, a pawl for rotating said ratchet wheel, a lever for operating said pawl, and means for operating said lever including a cam adapted to be operated by the reversible transmission device.

27. In a winding machine, the combination with a winding spindle, of winding devices associated with said winding spindle, means for reciprocating the said winding spindle including a reversible transmission device, means for counting the number of layers laid by the winding devices including a graduated dial, a disk relatively adjustable with respect to said dial, a pin carried by said disk, a ratchet wheel relatively movable with respect to the said disk, a pawl for rotating the said ratchet in one direction, a pin carried by said ratchet wheel adapted to contact with the aforesaid pin carried by the said disk when the ratchet is moved in the reverse direction, a lever for operating said pawl, a roller carried by said lever, and means for rocking said lever including a cam adapted to be carried by the reversible transmission device.

28. In a winding machine, the combination with a winding spindle, of winding devices associated with said winding spindle, means for reciprocating the said winding spindle including a reversible transmission device, means for counting the number of layers laid by the winding devices, including a ratchet wheel, an adjustable pawl for operating said ratchet wheel, an arm adapted to carry said pawl, another arm adapted to operate the first-mentioned arm, and means including a double cam for operating said second-mentioned arm at each end of the reciprocating of the winding spindle.

29. In a winding machine, the combination with a winding spindle, of winding devices associated with said winding spindle, means for reciprocating the said winding spindle including a reversible transmission device, mechanism for controlling the same, means for guiding a number of layers led by the winding devices including a ratchet wheel, an adjustable pawl for operating said ratchel wheel, a rock arm adapted to carry said pawl, another rock arm adapted to operate the first mentioned rock arm, and means for operating the said second mentioned rock arm including a cam carried by the controlling mechanism for the reversible transmission device.

30. In a winding machine, the combination with a winding spindle, of winding devices associated with said winding spindle, means for reciprocating said winding spindle, means for counting the number of layers wound by the winding devices, and means for reducing the length of the layers wound successively including movable screws operated by the said counting mechanism.

31. In a winding machine, the combination with a winding spindle, of winding devices associated with said winding spindle, means for reciprocating said winding spindle, means for counting the number of layers wound by the winding devices, and means for reducing the length of the layers successively wound including right and left screws operated by the counting mechanism.

32. In a winding machine, the combination with a winding spindle, of winding devices associated with said winding spindle, means for reciprocating said winding spindle, means for counting the number of layers wound by the winding devices, and means for reducing the length of the layers successively wound including right and left screws operated simultaneously by the counting mechanism.

33. In a winding machine, the combination with a winding spindle, of winding devices associated with said winding spindle, means for reciprocating said winding spindle including a movable slide, means for counting the number of layers wound by the winding devices, and means for successively reducing the length of the layers wound including right and left screws operated by the counting mechanism for controlling the length of travel of the said slide of the reciprocating means.

34. In a winding machine, the combination with a winding spindle, of winding devices associated with said winding spindle, means for reciprocating said winding spindle including a movable slide, a pin provided on each end of said slide, and means for successively reducing the length of the layers wound by the winding devices including progressively movable screws adapted to contact with the respective pins on the ends of the aforesaid slide.

35. In a winding machine, the combination with a winding spindle, of winding devices associated with said winding spindle, means for reciprocating said winding spindle including a movable slide, a pin provided on each end of the said slide, means for counting the number of layers laid by the winding devices, and means for successively reducing the length of the layers wound by the winding devices including progressively movable right and left screws operated by the counting means, and adapted to contact alternately with the pins on the ends of the aforesaid slide for reducing the distance of travel of the reciprocating means.

36. In a winding machine, the combination with a winding spindle, of winding devices associated with said winding spindle, means for reciprocating said winding spindle, and means for adjusting the length of reciprocation of the said winding spindle including right and left screws.

37. In a winding machine, the combination with a winding spindle, of winding devices associated with said winding spindle, means for reciprocating said winding spindle, means for counting the number of layers wound by the winding devices, means for adjusting the length of the reciprocation of said winding spindle including right and left screws, and means for rotating said screws including a shaft of the counting means.

38. In a winding machine, the combination with a winding spindle, of winding devices associated with said winding spindle, means for reciprocating said winding spindle, means for counting the number of layers wound by the winding devices, means for adjusting the length of the reciprocation of said winding spindle including right and left screws, and means for rotating said screws including a shaft, a gear keyed to said shaft, another gear adapted to mesh with said first mentioned gear, and means including a rotatable shaft of the counting means adapted to operate said second mentioned gear.

39. In a winding machine, the combination with a winding spindle, of winding devices associated with said winding spindle, means for reciprocating said winding spindle, means for counting a predetermined number of layers to be wound by the winding devices, means for successively reducing the length of the layers progressively wound, and means for stopping the reciprocation of said winding spindle including an electrical circuit completed by the counting mechanism when the predetermined number of layers have been wound.

40. In a winding machine, the combination with a winding spindle, of winding devices associated with said winding spindle, means for reciprocating said winding spindle, including a slide connected to said winding spindle, electrical contacts operated by said slide, means for counting a predetermined number of layers to be wound by the winding devices, another set of electrical contacts operated by said counting means, and means for stopping the reciprocation of the winding spindle including an electrical circuit completed by the closing of the aforesaid groups of contacts when the predetermined number of layers have been wound.

41. In a winding machine, the combination with a winding spindle, of winding devices associated with said winding spindle, means for reciprocating said winding spindle, a group of electrical contacts operated by said reciprocating means, means for counting a predetermined number of layers to be wound by the winding devices, a group of electrical contacts operated by said counting means, and means for stopping the reciprocation of the winding spindle and operation of the winding devices including an electrical circuit completed by the closing of the aforesaid groups of electrical contacts when the predetermined number of layers have been wound.

42. In a winding machine, the combination with a winding spindle, of winding devices associated with said winding spindle, means for reciprocating said winding spindle, a group of electrical contacts operated by said reciprocating means, means for counting a predetermined number of layers to be wound by the winding spindle, a group of electrical contacts operated by said counting means, means for controlling the starting of the machine including a lever, and means for stopping the machine including an electrical circuit completed by the operation of the aforesaid groups of contacts for operating the said starting lever to stop the machine when the predetermined number of layers have been wound.

In testimony whereof, I affix my signature.

FREDERICK W. COTTERMAN.